United States Patent
Katsuyama

(10) Patent No.: US 11,501,456 B2
(45) Date of Patent: Nov. 15, 2022

(54) APPLICATION CONTROL DEVICE, APPLICATION CONTROL METHOD, PROGRAM AND STORAGE MEDIUM THAT NATURALLY CONCEAL A LOCAL DIFFERENCE IN BRIGHTNESS ON SKIN

(71) Applicant: SHISEIDO COMPANY, LTD., Tokyo (JP)

(72) Inventor: Tomoyuki Katsuyama, Kanagawa (JP)

(73) Assignee: Shiseido Company, Ltd., Tokyo (JP)

( * ) Notice: Subject to any disclaimer, the term of this patent is extended or adjusted under 35 U.S.C. 154(b) by 54 days.

(21) Appl. No.: 16/470,327

(22) PCT Filed: Dec. 18, 2017

(86) PCT No.: PCT/JP2017/045299
§ 371 (c)(1),
(2) Date: Jun. 17, 2019

(87) PCT Pub. No.: WO2018/117020
PCT Pub. Date: Jun. 28, 2018

(65) Prior Publication Data
US 2019/0318489 A1    Oct. 17, 2019

(30) Foreign Application Priority Data
Dec. 20, 2016  (JP) .............. JP2016-246652

(51) Int. Cl.
*G06T 7/40* (2017.01)
*G06T 7/11* (2017.01)
*G06T 7/174* (2017.01)
*G06T 7/00* (2017.01)

(52) U.S. Cl.
CPC .............. *G06T 7/40* (2013.01); *G06T 7/0012* (2013.01); *G06T 7/11* (2017.01); *G06T 7/174* (2017.01); *G06T 2207/30088* (2013.01)

(58) Field of Classification Search
CPC ........ A61B 18/203; A61B 2018/00452; A61B 2018/0047; A61B 2017/00765; A61B 2018/00005; A61B 2018/00476; A61B 2018/2023; A61B 2018/20355; A61B 5/0059; A61B 5/441; A61B 18/1206;
(Continued)

(56) References Cited

U.S. PATENT DOCUMENTS

| | | | |
|---|---|---|---|
| 8,184,901 B2* | 5/2012 | Edgar ................. | G06T 7/11 382/162 |
| 8,695,610 B2 | 4/2014 | Samain et al. | |
| 9,384,543 B2 | 7/2016 | Stephan et al. | |
| 2007/0035815 A1* | 2/2007 | Edgar ................. | A61B 5/442 359/359 |
| 2009/0060856 A1* | 3/2009 | Katsuyama .......... | A61K 8/891 424/63 |

(Continued)

FOREIGN PATENT DOCUMENTS

| | | |
|---|---|---|
| EP | 2 335 576 A2 | 6/2011 |
| JP | 2008-206752 A | 9/2008 |

(Continued)

*Primary Examiner* — Golam Sorowar
(74) *Attorney, Agent, or Firm* — Foley & Lardner LLP

(57) ABSTRACT

An application control device according to an embodiment of the present invention has an acquisition unit that acquires image data of a skin; a division unit that divides the image data into a plurality of segments each smaller than or equal to 200 μm; and a calculation unit that calculates, from a value of one or a plurality of segments of the image data, an application amount of a cosmetic material to be applied to each portion of the skin.

8 Claims, 16 Drawing Sheets

(58) Field of Classification Search
CPC ............... A61B 18/1402; A61B 18/20; A61B
2017/00734; A61B 2018/00011; A61B
2018/00458; G06T 2207/10024; G06T
2207/30201; G06T 11/001; G06T 11/60;
G06T 2207/10004; G06T 2207/20021;
G06T 7/90; G06T 2207/30088; A45D
2044/007; A45D 44/005; A45D 2034/002;
A45D 2200/1018; A45D 34/04; A45D
34/06; A45D 44/002; A45D 33/006;
A45D 33/24; A45D 33/32; A45D 40/18;
A45D 40/222

See application file for complete search history.

(56) References Cited

U.S. PATENT DOCUMENTS

| | | | | |
|---|---|---|---|---|
| 2015/0313516 | A1* | 11/2015 | Shimizu | A61B 5/14546 |
| | | | | 600/322 |
| 2016/0357578 | A1* | 12/2016 | Kim | A45D 44/005 |
| 2017/0256084 | A1* | 9/2017 | Iglehart | G06K 9/00221 |
| 2017/0259599 | A1* | 9/2017 | Shinoda | H04N 1/00023 |

FOREIGN PATENT DOCUMENTS

| | | |
|---|---|---|
| JP | 2009-504678 A | 2/2009 |
| JP | 2013-019909 A | 1/2013 |
| JP | 5603331 B2 | 8/2014 |
| KR | 10-2016-0142742 A | 12/2016 |
| WO | WO-2009/137277 A2 | 11/2009 |

\* cited by examiner

FIG. 6

| 1/256 | 4/256 | 6/256 | 4/256 | 1/256 |
|---|---|---|---|---|
| 4/256 | 16/256 |  | 16/256 | 4/256 |
| 6/256 |  |  |  | 6/256 |
| 4/256 | 16/256 |  | 16/256 | 4/256 |
| 1/256 | 4/256 | 6/256 | 4/256 | 1/256 |

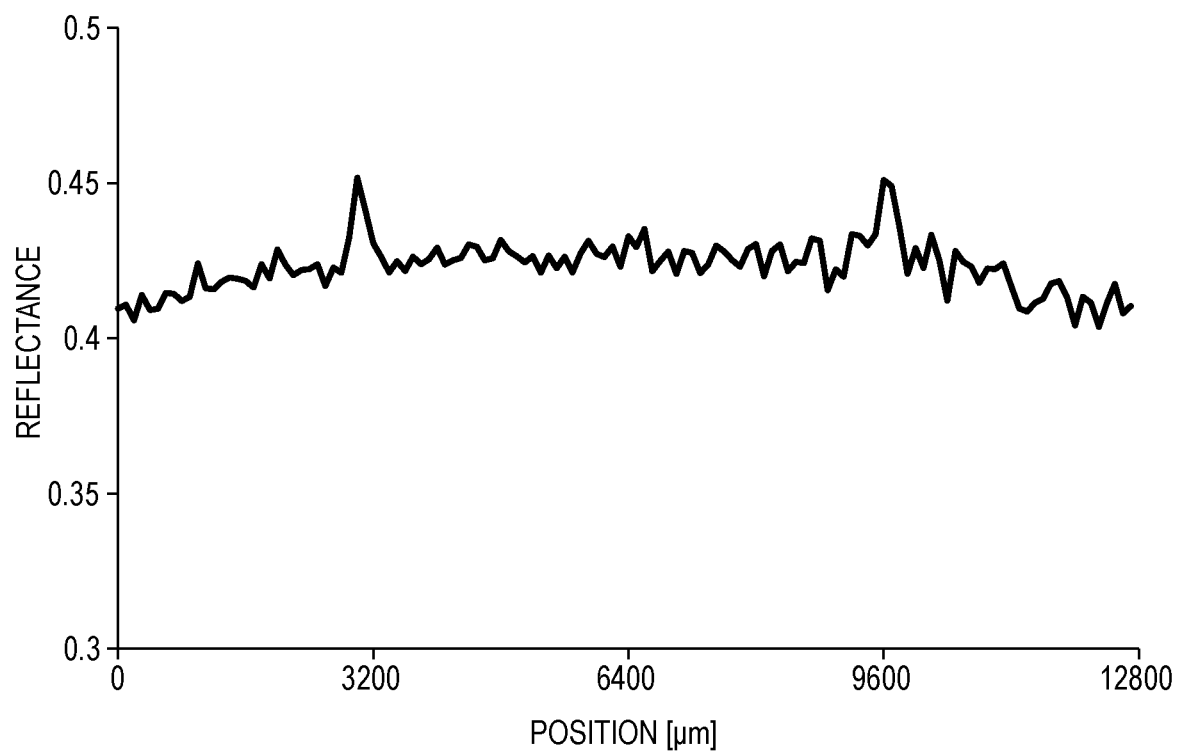

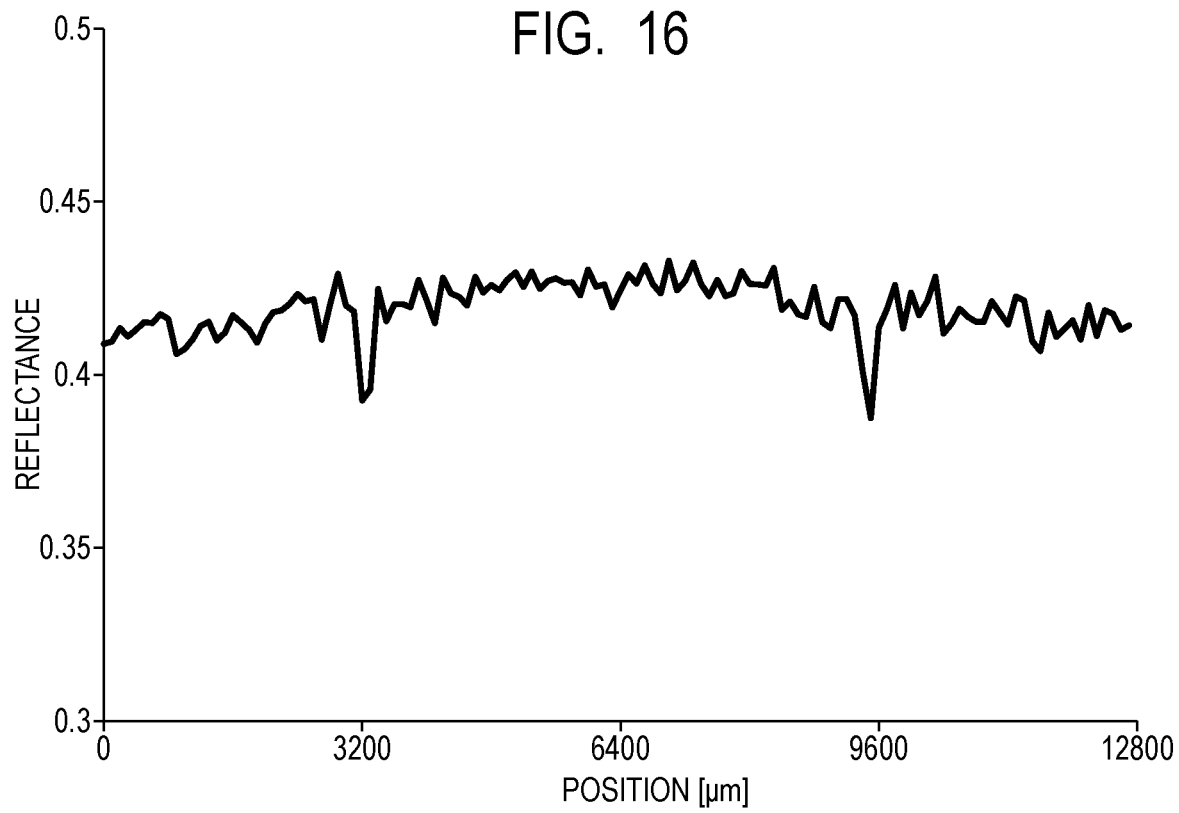

APPLICATION CONTROL DEVICE, APPLICATION CONTROL METHOD, PROGRAM AND STORAGE MEDIUM THAT NATURALLY CONCEAL A LOCAL DIFFERENCE IN BRIGHTNESS ON SKIN

CROSS-REFERENCE TO RELATED APPLICATIONS

This application is the U.S. National Stage of PCT/JP2017/045299, filed Dec. 18, 2017, which claims priority to JP 2016-246652, filed Dec. 20, 2016.

TECHNICAL FIELD

The present invention relates to an application control device, an application control method, a program, and a storage medium storing the program.

BACKGROUND ART

Natural makeup is one of the attractive makeup methods to give a finish leaving a texture like a bare skin, which is supported by many women of all ages. The basic technique of natural makeup is to apply a thin layer of foundation. Since aging causes age spots, freckles and color unevenness, however, natural makeup becomes difficult with aging.

Accordingly, a method that uses a high-concealable concealer or applies more foundation to a portion having an age spot or a freckle, or the like is used.

However, applying a cosmetic material such as concealer or foundation to only a specific portion of the skin such as a portion of an age spot is of a very difficult scheme, which is problematic because such technique is extremely difficult for general users. Because a cosmetic material such as concealer or foundation is applied on the skin directly or by using a makeup tool such as a brush or a sponge or using a finger, the boundary between an applied region and a non-applied region becomes unnatural and noticeable. Accordingly, to eliminate the unnaturalness of such a boundary, a method in which the application amount of the cosmetic material is gradually reduced across the boundary between an age spot and a bright region (a region without an age spot) is widely used. However, when the applying cosmetic material is spread thinly, the concealing capability at a position to be concealed may become insufficient, and on the contrary, when many layers of the cosmetic material are applied on the age spot, an excessive amount of the cosmetic material may also be applied to the surrounding bright region of the bare skin in which the application is not necessary.

Therefore, while there is a high demand for natural makeup, significantly high application accuracy and much time to perform an accurate application process are required to eliminate unnaturalness of the boundary between a region where the cosmetic material is applied and a region where the cosmetic material is not applied and finish the makeup beautifully, and it is therefore problematic that it is very difficult for general users to do natural makeup on a daily basis.

Further, in addition to an age spot or a freckle, when a cosmetic material is applied to conceal any local difference in brightness on the skin, for example, such as a white spot at which a portion of the skin becomes whiter compared to the periphery, there is the same problem as in the case of an age spot or a freckle.

To address such problems, Patent Literature 1 discloses a method in which an applying object is formed on a skin or a lip so as to have an optical property closer to the optical property of a predetermined location which is closer to the predetermined location and substantially eliminate the boundary to provide natural impression. Further, Patent Literature 1 discloses that the applying object can be formed by using an ink-jet scheme.

CITATION LIST

Patent Literature

PTL 1: Japanese Patent No. 5603331

SUMMARY OF INVENTION

Technical Problem

Even with the method according to Patent Literature 1, however, since it is still inevitable that more cosmetic material than necessary be applied, a local difference in brightness on the skin may not be sufficiently concealed without unnaturalness, and there is a demand for further improvement.

The present invention has been made in view of the problems described above and intends to provide an application control device of a cosmetic material, an application control method, a program, and a storage medium that naturally conceal a partial difference in brightness on a skin.

Solution to Problem

An application control device according to an embodiment of the present invention has an acquisition unit that acquires image data of a skin; a division unit that divides the image data into a plurality of segments smaller than or equal to 200 μm; and a calculation unit that calculates, from a value of one or a plurality of segments of the image data, an application amount of a cosmetic material to be applied to each portion of the skin.

Further, an application control method according to an embodiment of the present invention includes steps of: acquiring image data of a skin; dividing the image data into a plurality of segments smaller than or equal to 200 μm; and calculating, from a value of one or a plurality of segments of the image data, an application amount of a cosmetic material to be applied to each portion of the skin.

Further, a program according to an embodiment of the present invention causes a computer to execute: an acquisition process that acquires image data of a skin; a division process that divides the image data into a plurality of segments smaller than or equal to 200 μm; and a calculation process that calculates, from a value of one or a plurality of segments of the image data, an application amount of a cosmetic material to be applied to each portion of the skin.

Further, a computer readable storage medium according to an embodiment of the present invention stores the program described above.

Advantageous Effects of Invention

According to the present invention, it is possible to provide an application control device, an application control method, a program, and a storage medium that naturally conceal a local difference in brightness on a skin.

BRIEF DESCRIPTION OF DRAWINGS

FIG. 6 is a diagram illustrating an example of a Gaussian filter.

FIG. 15 is a graph illustrating a reflectance distribution of Comparative Example 1.

FIG. 16 is a graph illustrating a reflectance distribution of Comparative Example 2.

DESCRIPTION OF EMBODIMENTS

Next, an application control device, an application control method, a program, and a storage medium according to the present invention will be further described in detail with reference to the drawings illustrating the embodiments. While the embodiments described below are preferred embodiments for the present invention and various preferable technical limitations are added thereto, the scope of the present invention is not limited to these aspects unless description to limit the present invention is stated in the description below.

First Embodiment

[Application System]

Figure 1:
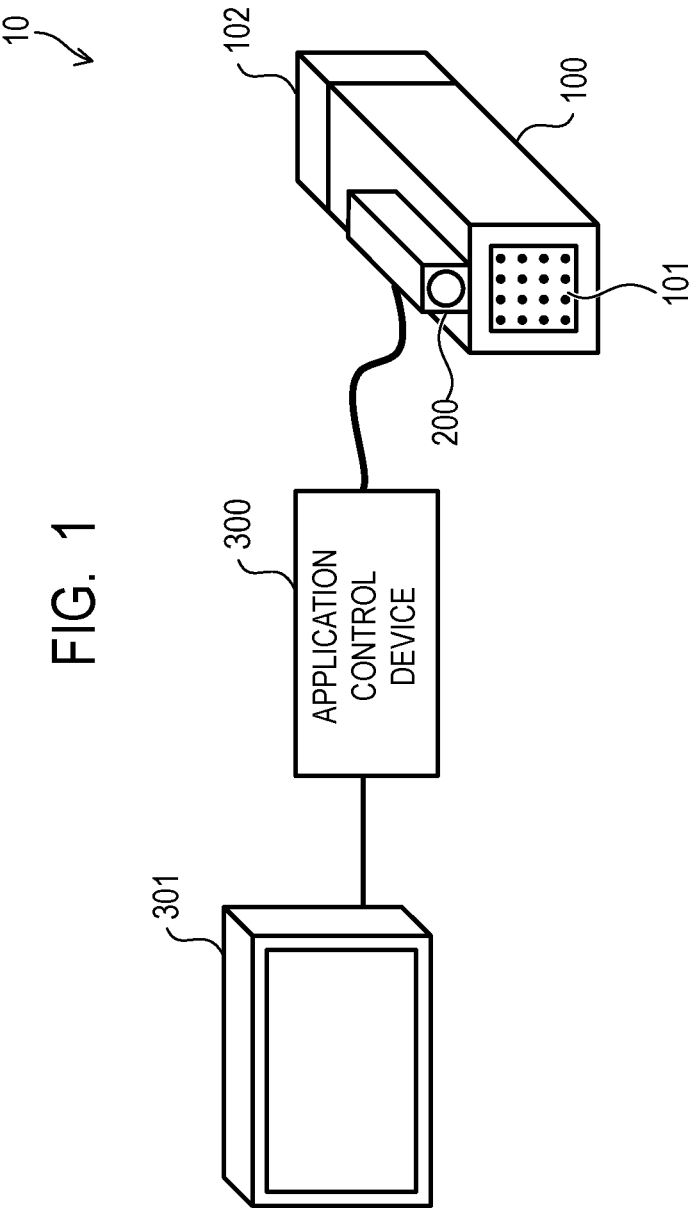
FIG. 1 is an external view illustrating an example of a configuration in an application system according to a first embodiment.

FIG. 1 is an external view illustrating the configuration in an application system 10 according to the present embodiment. The application system 10 has an application device 100, an image capture unit 200, and an application control device 300. The application device 100 is a device for applying a cosmetic material to a skin and is held by a user. The application device 100 has a prismatic casing, and an application head 101 is provided on one end face of the casing. The shape of the application device 100 is not limited thereto as long as the shape is easily held by the user and may be cylindrical or hemispherical. Further, the application device 100 may have a holding member such as a handle.

The application head 101 is formed of an ink-jet head, for example, and has a plurality of nozzles for ejecting a cosmetic material. The plurality of nozzles are two-dimensionally arranged and can form an application film of a cosmetic material by ejecting the cosmetic material to a predetermined region of a skin. A cosmetic material tank 102 is attached to the application device 100, and the cosmetic material is supplied from the cosmetic material tank 102 to the application head 101. The cosmetic material tank 102 may be provided inside the application device 100. The cosmetic material may be liquid concealer, liquid foundation, or the like used for concealing an object that causes a local difference in brightness on a human skin including a face, for example, an age spot, a freckle, a skin pore, a white spot, various scars, or the like.

The image capture unit 200 is provided on the side face (top face) of the casing of the application device 100 in the same orientation as the application head 101. The image capture unit 200 has a lens, an image pickup device, or the like and can capture an image (second image) of a skin in a narrow range on which application is performed by the application head 101. The image capture unit 200 is coupled to the application head 101, and the relative position of the image capture unit 200 to the application head 101 is fixed. The image capture unit 200 may be integrally formed with the application head 101.

The application device 100 and the image capture unit 200 are controlled by the application control device 300. The application control device 300 is connected to the application device 100 and the image capture unit 200 via a wired connection component such as a Universal Serial Bus (USB) cable or via a wireless connection such as Bluetooth (registered trademark), Wi-Fi, or the like. The application control device 300 may be embedded in the application device 100, and when the application control device 300 is embedded in the application device 100, the application control device 300 may include the members contained in the application device 100 illustrated in FIG. 1, for example, the application head 101 or the like. The application control device 300 pre-stores images (first image, image data of the skin) of a wide range of the skin including an age spot, a freckle, a skin pore, or the like that may be an application target. The application control device 300 can identify the position of the application head 101 on the skin by comparing the second image acquired from the image capture unit 200 with the first image. The application control device 300 has a display 301, and the display 301 displays various information such as an image of the skin, the status of the application head 101, or the like.

When the user holds the application device 100 and brings the application head 101 close to the skin, the application control device 300 recognizes the position of the application head 101 on the skin and displays the current position of the application head 101 on the display 301. The user moves the application head 101 along the skin while checking the display 301, and the application head 101 automatically starts application of a cosmetic material when reaching a position at which an application target is present. At this time, the cosmetic material is applied based on an application amount of a cosmetic material calculated by the application control device 300 (details will be described below).

Figure 2:
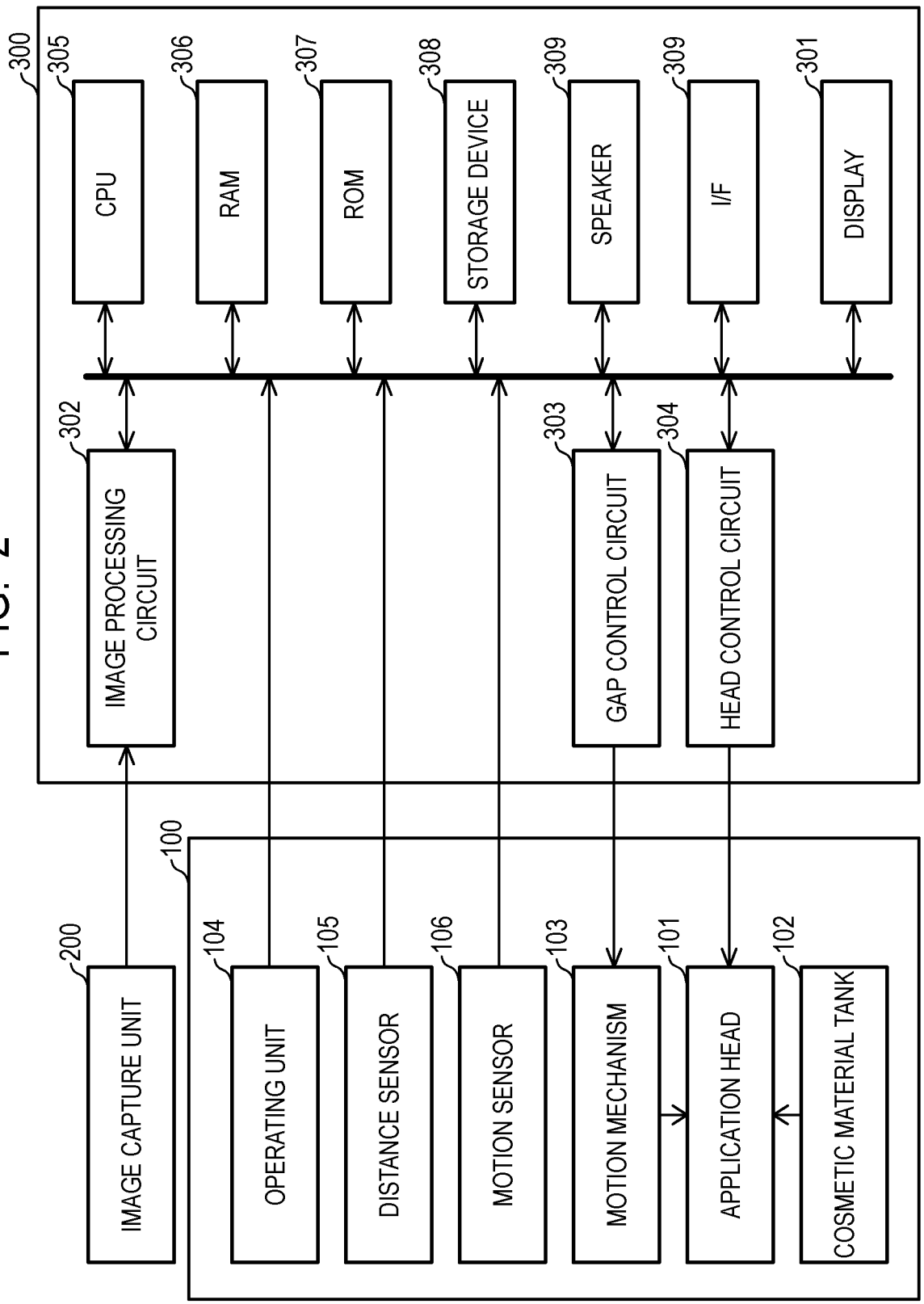
FIG. 2 is a block diagram illustrating an example of a configuration in the application system according to the first embodiment.

FIG. 2 is a block diagram illustrating a configuration example in the application system 10 according to the present embodiment. The application device 100 has the application head 101, the cosmetic material tank 102, a motion mechanism 103, an operating unit 104, a distance sensor 105, and a motion sensor 106. The application control device 300 has the display 301, an image processing circuit 302, a gap control circuit 303, a head control circuit 304, a CPU 305, a RAM 306, a ROM 307, a storage device 308, a speaker 309, and an I/F 310. The CPU 305 may function as an acquisition unit, a division unit, or a calculation unit. Further, the storage device 308 may function as a storage unit.

The application head 101 is a piezoelectric ink-jet head, for example, and is formed of a nozzle, a pressure chamber, a piezoelectric element, a drive circuit, or the like. The pressure chamber is filled with a cosmetic material, and when a voltage is applied from a drive circuit to a piezoelectric element, the volume of the pressure chamber changes due to deformation of the piezoelectric element. Thereby, the cosmetic material is ejected in a form of droplets from the nozzle. Note that the application head 101 may be a thermal ink-jet head that heats a cosmetic material by a heating member and ejects the cosmetic material by the pressure of generated bubbles. The application head 101 operates based on a control signal from the head control circuit 304.

The cosmetic material tank 102 contains a cosmetic material and supplies the cosmetic material to the application head 101. The cosmetic material tank 102 may be a cartridge type container that is easy to be replaced. The cosmetic material is a liquid having a predetermined viscosity that enables ejection from the application head 101. Specifically, the cosmetic material may be a substance that can conceal a local difference in brightness on the skin, for example, concealer, foundation, face powder, or the like. A plurality of cosmetic material tanks 102 may be provided to contain a plurality of cosmetic materials of different types or color tones. For example, four cosmetic material tanks 102 are provided so as to be able to apply cosmetic materials of three colors of yellow, magenta, and cyan and a cosmetic material that can adjust illuminance, and a group of the four nozzles corresponding to the cosmetic materials can be provided on the application head 101.

The motion mechanism 103 is formed of an actuator, a guide member, or the like and can drive the application head 101 forward and backward in the longitudinal direction of the application device 100, that is, in the direction perpendicular to a skin when the application head 101 faces the skin. The motion mechanism 103 performs the position control of the application head 101 in accordance with a control signal from the gap control circuit 303.

The operating unit 104 has an operating member such as a power switch, a menu button, an application button for performing application, or the like and is used by the user to provide an instruction to the application device 100. The application control device 300 controls the operation of the application device 100 in accordance with the instruction of the user input from the operating unit 104. The application button is preferably arranged at a position at which the user can easily operate while holding the application device 100 and is arranged at a position touched by a finger of the user when the user holds the application device 100, for example. Thereby, even when the user moves the application device 100 to a portion which cannot be directly viewed (such as a cheek), the user can operate the application button by groping.

The distance sensor 105 is an infrared sensor, an ultrasonic sensor, or the like, for example, emits a detection wave such as an infrared ray, an ultrasonic wave, or the like to an object, and receives the reflected wave. The distance sensor 105 can detect the distance to an object based on a time period from emission of a detection wave to reception of the reflected wave. Further, a plurality of distance sensors 105 are provided in the periphery of the application head 101, and it is also possible to detect the inclination of the application head 101 relative to the skin. The application control device 300 maintains a constant distance between the skin and the application head 101 based on a detection signal from the distance sensor 105, and it is also possible to control the application head 101 so as not to eject the cosmetic material when the application head 101 is inclined with respect to the skin, for example.

The motion sensor 106 includes an acceleration sensor, a gyro sensor, or a geomagnetic sensor and detects motion of the application head 101 such as movement, rotation, or the like. The acceleration sensor is formed of a capacitance detection element, for example, and can detect an acceleration applied to the application head 101. The gyro sensor is formed of a piezoelectric vibration element, for example, and has a function to detect the orientation of the application head 101. The geomagnetic sensor can identify the orientation of the application head 101 by detecting the geomagnetism. Based on the detection signal from the motion sensor 106, the application control device 300 can control the application head 101 so as not to eject the cosmetic material when the application head 101 is moving fast, for example.

The image capture unit 200 has an optical system, an image pickup device, and an analog-to-digital (A/D) converter. The optical system has an optical filter, a fixed lens, and a focus lens and forms a subject image by focusing a light from a subject (skin) on an imaging surface of the image pickup device. A polarization filter can be attached to the optical system, and the specular reflection can be reduced. The image pickup device is a Complementary Metal Oxide Semiconductor (CMOS) image sensor or a Charge Coupled Device (CCD) image sensor, for example, and has a plurality of two dimensionally arranged pixels, color filters, and micro-lenses. A plurality of pixels may include pixels for image capturing or pixels for focus detection. Further, the image pickup device has an electronic shutter function to control a charge accumulation time period. Each of the plurality of pixels outputs a pixel signal based on an incident light from the optical system. The A/D converter is formed of a comparison circuit, a latch circuit, or the like and converts an analog pixel signal from the image pickup device into digital RAW data. The image capture unit 200 can output a moving image of a predetermined frame rate in addition to a static image. Note that, while the image capture unit 200 according to the present embodiment has a function to capture an image (second image) of the skin in a narrow range on which the application is performed by the application head 101, the image capture unit 200 may also have a function to capture an image (first image) of a wide range of a skin that may be an application target.

The display 301 is formed of a liquid crystal display or an organic Electro Luminescence (EL) display, for example. The display 301 performs various display such as an image from the image capture unit 200, an image stored in the storage device 308, status information on the application head 101, a menu screen, or the like based on data from the CPU 305. The display 301 may be a touchscreen and may also function as the operating unit 104.

The image processing circuit 302 includes a numerical operation circuit and performs a demosaicing process on the RAW data from the image capture unit 200 to generate image data (RGB image) having each color value of red (R), green (G), or blue (B) for each pixel. The image processing circuit 302 also has a function of performing digital image processing such as white balance adjustment, gamma correction, edge enhancement, gradation conversion, noise reduction, compression, or the like on the image data.

The gap control circuit 303 controls a spacing (gap) between the skin and the application head 101 by outputting a control signal to the motion mechanism 103. The gap control circuit 303 can control the position of the application head 101 so as to maintain a constant distance from the skin based on a detection signal from the distance sensor 105. The head control circuit 304 outputs control signals indicating information on a nozzle used for ejecting a cosmetic material, an application amount, or the like to the application head 101 based on an instruction from the CPU 305.

The central processing unit (CPU) 305 has a CPU core, a cache memory, or the like and integrally controls each part of the application control device 300. Further, details will be described below, and the CPU 305 acquires image data of a skin from the storage device 308 (acquisition unit), divides the image data into a plurality of segments (division unit), and calculates the amount of a cosmetic material to be applied to the skin (calculation unit). The random access memory (RAM) 306 is a Dynamic RAM (DRAM), for example, and used for a work field of the CPU 305, a load field of a program, or the like. The RAM 306 temporarily stores data required for a process of the CPU 305, image data generated in the image processing circuit 302, image data read from the storage device 308, or the like. The read only memory (ROM) 307 is an Electrically Erasable Programmable ROM (EEPROM), for example, and stores various setting files, a basic program such as an operating system (OS), and a control program for controlling the operation of the application device 100.

The storage device (storage unit) 308 is a flash memory or a hard disk, for example, may store image data of a skin in a wide range (first image), an image of a skin in a narrow range on which application of the cosmetic material is performed (second image), other images, or the like. The storage device 308 may store RAW data from the image capture unit 200, image data generated in the image processing circuit 302, and the like. Further, the storage device 308 can store image data captured by an external image pickup device via the I/F 310 and can also store image data on the internet via the I/F 310. Further, the storage device 308 may be a portable storage medium and may be formed so as to be removable from the application control device 300 via a memory card slot, a USB connector, or the like.

The speaker 309 has a piezoelectric vibration unit, a drive circuit, or the like and outputs a sound wave signal based on data from the CUP 305. The speaker 309 can play a voice message, a sound effect, or the like and is used to notify the user of the operating status of the application device 100, for example.

The interface (I/F) 310 transmits and receives data to and from the outside such as the internet, various peripheral devices, or the like.

[Application System Operation]

Subsequently, an operation of the application system 10 will be described.

First, the application control device 300 calculates an application amount of a cosmetic material to be applied to a skin by using image data of the skin stored in the storage device 308 (details will be described below). The application device 100 then applies the cosmetic material to the skin from the application head 101 based on the application amount of the cosmetic material calculated by the application control device 300.

At this time, the application control device 300 determines the position of the second image (an image of the skin in a narrow range on which the application is performed) in the first image (an image data of a wide range of a skin). Then, the application control device 300 can control the application head 101 so as to have the application amount at a determined position in the distribution of the application amount of the cosmetic material calculated by the application control device 300. A determination method of the position of the second image in the first image is not particularly limited, and any method may be used.

While the position of the second image captured by the image capture unit 200 is determined in the first image pre-stored in the storage device 308 and a cosmetic material is applied from the application head 101 based on the determination result in the present embodiment, the present invention is not limited to such a form. For example, a form in which an application amount is calculated in real time from an image captured by the image capture unit 200 and a cosmetic material is applied with the application amount may be employed.

[Application Control Device and Application Control Method]

Next, prior to describing a more detailed embodiment of the application control device and the application control method according to the present invention, a calculation model used in the present embodiment and other embodiments described below will be described.

[Skin Structure]

Figure 3:
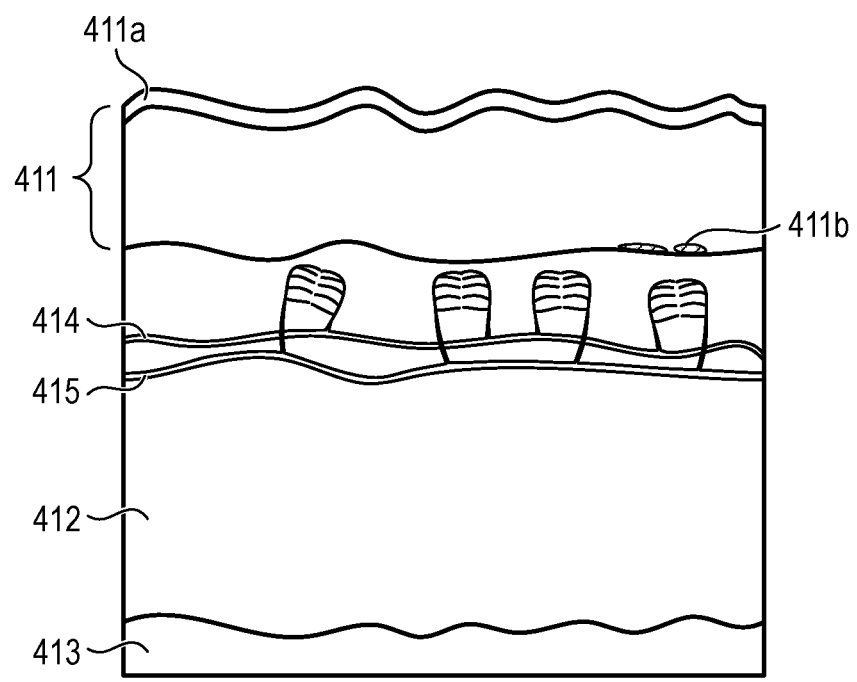
FIG. 3 is the schematic diagram illustrating an example of the human skin structure.

FIG. 3 is a schematic diagram illustrating an example of the layered structure of a human skin assumed in the calculation model, and the general structure of a facial skin is specifically illustrated. Note that, even with a skin other than a skin of a face, while each layer has a different thickness (for example, a horny layer of a sole of a foot is thicker than that of a face), the layered structure is the same as the example illustrated in FIG. 3.

A human skin is roughly divided into an epidermal layer 411 including a horny layer 411a, a dermis layer 412, and a hypodermis 413 from the outermost layer side to the inside and has a layered structure. The horny layer 411a is located outermost in the epidermal layer 411.

A melanin pigment is produced at the bottom layer of the epidermal layer 411. A melanin pigment serves as a protector for the skin from ultraviolet light. However, the produced melanin pigment is deposited in the epidermal layer 411 due to various factors such as aging and forms a melanin pigmented portion 411b, and as a result, the skin appears dark and is recognized as an age spot.

The dermis layer 412 located inside the epidermal layer 411 has blood vessels running inside. The blood vessel is formed of a series of an artery 414 and a vain 415. Arterial blood sent from the heart travels through the inside of the arteries 414 in the dermis layer 412, and after transportation of various materials such as exchange of oxygen and carbon dioxide, arterial blood changes to venous blood, flows in the veins 415 in the dermis layer 412, and returns to the heart.

The hypodermis 413 is the innermost part of the skin, and most of the hypodermis 413 is formed of subcutaneous fat. In addition, a nerve, a sweat gland, a lymphatic vessel, and the like (not illustrated) are spread inside the skin.

[Skin Texture Change Caused by Application Substance]

Next, occurrence of an opaque texture on a skin due to the presence of a high-concealable application substance on the skin as illustrated in FIG. 3 will be described based on a light emitted to the skin and the shape and characteristics of the skin.

The tissues of the epidermal layer 411 and the dermis layer 412 including the horny layer 411a out of the tissues forming the skin are translucent, and a visible light easily penetrates the tissues. A light penetrating the skin is reflected by tissues inside the skin, and a part of the light is scattered inside while being absorbed repeatedly by blood and melanin, and a part of the scattered light is again emitted out of the skin surface. Here, assuming that a light is emitted to a certain point on a skin, it can be observed that the light which is again emitted out of the skin is spread concentrically around the entry point. As described above, it can be considered that a light emitted on a skin scattering inside the skin and being emitted out of a wide range including the entry point has, so to speak, the same effect as irradiating the skin surface with light from the backside.

Next, how the appearance of a skin changes due to the effect of irradiating the skin from the backside will be described. There are fine unevenness parts referred to as wrinkles or a texture on the skin surface, and it is here considered how such fine unevenness parts on the skin surface look.

Under general indoor lighting, since the illuminance changes depending on the relationship between an orientation of an uneven surface and a direction of lighting, a bright portion and a dark portion occur. It can be said that the contrast of brightness and darkness is the very signal indicating that there are fine unevenness parts on the surface, and a greater contrast ratio enables easier recognition of the surface. It can also be said the mechanism is the same as the mechanism in which eyes work so as to maximize a contrast ratio when focusing on the surface. However, when the uneven surface is irradiated from the backside, the contrast of the unevenness is reduced, and conversely, it is difficult to recognize the surface. The former allows the presence of the surface to be clearly recognized, and the latter makes the presence of the surface unclear. When the degree of easiness of recognizing the surface is expressed as a texture, it is considered that the former gives an impression of dullness and the latter gives an impression of depth or clearness.

That is, in the case of a skin, since a light can easily penetrate and the penetrating light irradiates the skin from the backside, the contrast of the unevenness on the surface is decreased, and therefore the skin gives an impression of depth or clearness. In contrast, when a high-concealable application substance is present on the skin surface, a light does not penetrate inside the skin, and thereby most of the light is reflected near the entry point. Therefore, the lighting effect from the backside is reduced, shadows produced by the unevenness on the skin surface occur depending only on an external lighting circumstance, and brightness and darkness look more emphasized than when no high-concealable application substance is applied on the skin surface. That is, unevenness is clearly visible on the skin to which a high-concealable application substance is applied. As described above, while the texture changes to dull when an application substance is applied to the skin surface, natural makeup with a small amount of an application substances leaves a bare skin-like texture and thus is favored by many women.

[Reason of Appearance of Unnaturalness on Boundary]

Then, the reason of occurrence of unnaturalness at the boundary between a region in which the application substance is formed and a region in which the application substance is not formed will be described. Here, a case where a concealable application substance is locally attached on a skin will be considered.

While the effect that occurs when a light enters a single point on a skin has been described in the description about the change of the skin texture, in contrast, a light emitted out of a single point on a skin will be considered here. It can be understood that a light emitted out of a single point of the skin is established by the sum of lights that enter the periphery of the point, scatter inside the skin, and travel around. Therefore, when a substance preventing a light from entering the skin is present at a position slightly apart from the point, there is no longer a light that is supposed to originally travel around from the position, which reduces brightness for the amount thereof. The high-concealable application substance is the very substance preventing the light entry and causes a greater effect at a position closer to the boundary of the application substance. This results in a phenomenon in which the vicinity of the boundary of the application substance becomes darker than the periphery. Therefore, the periphery of the application substance is surrounded by dark shadows, the applied portion is in a state of being emphasized and causes unnaturalness. For this reason, when foundation is applied to only the portion of an age spot so as not to cause unnaturalness, it is required that the application amount distribution be carefully adjusted especially at the boundary part.

As described above, however, it is significantly difficult for general users to apply a cosmetic material so as to cover the boundary between a region (dark portion) with an age spot and a region (bright portion) without an age spot on the skin and to gradually reduce the application amount of the cosmetic material.

Accordingly, the inventors have found that it is possible to naturally conceal a partial difference in brightness on a skin by calculating an application amount of a cosmetic material by using a predetermined calculation model and applying a cosmetic material by using an application device so as to apply the calculated application amount of the cosmetic material. In particular, as a result of intensive study by the inventors, it is found that unnaturalness at the application boundary of a cosmetic material is caused by (1) a unique optical property of a skin, that is, the property of a light penetrating and scattering, and (2) calculation accuracy of an application amount and application accuracy. Therefore, according to the calculation model in which at least one of the factors described above is considered in advance, an appropriate application amount for each point is theoretically calculated. Further, when an appropriate application amount distribution to conceal an age spot including the boundary without any unnaturalness is known, this can be useful reference information not only when a device is used for application but also when the user applies a cosmetic material by herself.

The present inventors thus found out about the calculation model below. The calculation model will be described below in detail.

[Calculation Model]

An application amount of a cosmetic material to be applied to a skin having the layered structure illustrated in FIG. 3 is calculated by using a calculation model.

Figure 4:
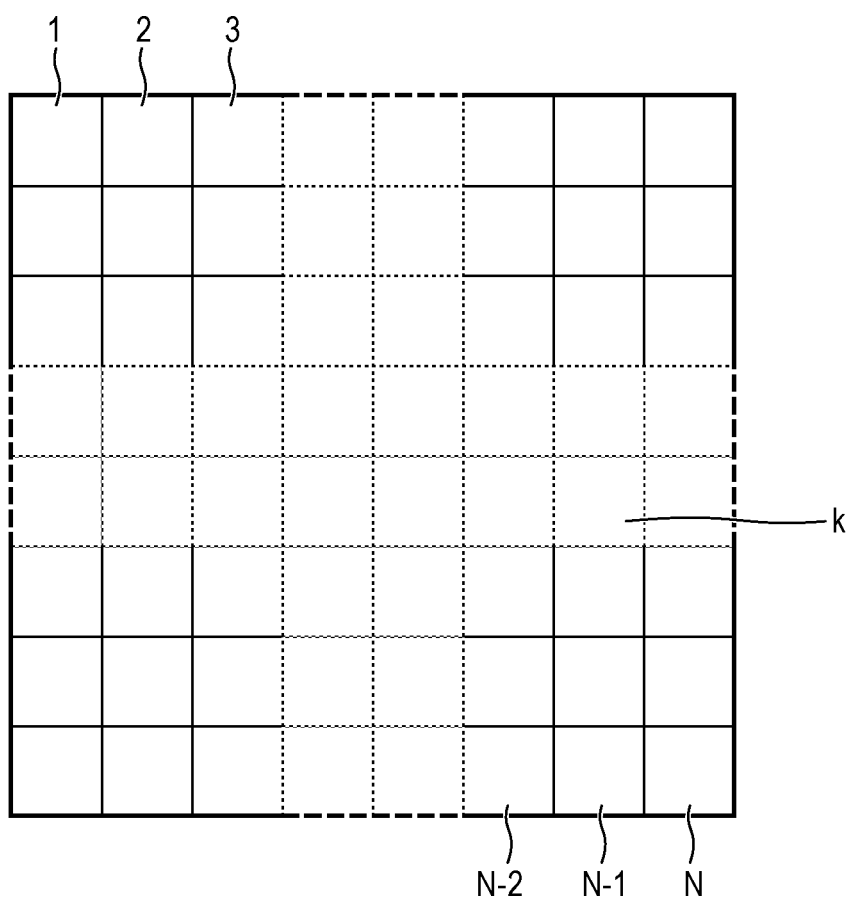
FIG. 4 is a schematic diagram illustrating an example of N segments on a skin surface.

In the calculation model, it is assumed that there are N segments on a skin surface. FIG. 4 is a schematic diagram illustrating an example of the N segments on the skin surface. Each of the N segments is a square having the identical area. A first segment 1, a second segment 2, a third segment 3, . . . , k-th segment k, . . . , (N−2)-th segment N−2, (N−1)-th segment N−1, and N-th segment N are arranged in order.

Here, the reflectance R of the k-th segment k is represented by a subscript such as R(k) or $R_k$. The application amount of the k-th segment k is represented as $x_k$. Further, scattering of a light from the k-th segment k to the k'-th segment k' is used as a spatial impulse response function of the skin and represented as $I_k(k, k')$. The spatial impulse response function represents a distribution of reflected light illuminance values obtained when the light is applied to an infinitesimal region and is referred to as a Point Spread Function (PSF). That is, when segments are considered, the spatial impulse response function is a function that, when light is evenly emitted to a certain single segment, represents how much light is emitted out of the periphery of a segment including that segment.

Further, the values $r_{out}$, $r_{in}$, $t_{out}$, and $t_{in}$ are defined as described below. Note that the subscript "out" means a direction from the skin surface to the outside, and the subscript "in" means a direction from the skin surface to the inside.

In the reflectance of a segment when the light is emitted to the segment, the value $r_{out}$ represents the reflectance based on a light emitted directly from the application substance without passing through the skin. As described below, since it is assumed that there is no reflection from the skin surface, it can be said that $r_{out}$ is a value when only the light reflected from the application substance is considered.

The value $r_{in}$ represents the reflectance based on a light emitted from a segment when the light is emitted to the segment from the backside of the skin. As with the value $r_{out}$, it can be said that $r_{in}$ is a value when only the light reflected from the application substance (inward of the skin) is considered.

The value $t_{out}$ represents the transmittance of a segment from the inside to the outside.

The value $t_{in}$ represents the transmittance of a segment from the outside to the inside.

Since these values are defined in accordance with the application amount of an application substance, when the application amount is denoted as x, these values are represented as $r_{out}(x)$, $r_{in}(x)$, $t_{out}(x)$ and $t_{in}(x)$, respectively.

Whole the description above is considered, the reflectance $R_n$ of the segment n is expressed by Equation (1).

[Math 1]

$$R_n = r_{out}(x_n) + t_{out}(x_n) \sum_k^N t_{in}(x_k) I_k(k, n) +$$
$$t_{out}(x_n) \sum_{k_2}^N \sum_{k_1}^N t_{in}(x_{k_1}) I_{k_1}(k_1, k_2) r_{in}(x_{k_2}) I_{k_2}(k_2, n) +$$
$$t_{out}(x_n) \sum_{k_3}^N \sum_{k_2}^N \sum_{k_1}^N t_{in}(x_{k_1}) I_{k_1}(k_1, k_2)$$
$$r_{in}(x_{k_2}) I_{k_2}(k_2, k_3) r_{in}(x_{k_3}) I_{k_3}(k_3, n) +$$
$$t_{out}(x_n) \sum_{k_4}^N \sum_{k_3}^N \sum_{k_2}^N \sum_{k_1}^N t_{in}(x_{k_1}) I_{k_1}(k_1, k_2) r_{in}(x_{k_2}) I_{k_2}(k_2, k_3)$$
$$r_{in}(x_{k_3}) I_{k_3}(k_3, k_4) r_{in}(x_{k_4}) I_{k_4}(k_4, n) + \ldots$$

Equation (1)

Here, the first term on the right side of the first line corresponds to a light obtained when the light is emitted to the segment n and reflected by the application substance, and the second term on the right side of the first line corresponds to a light obtained when the light transmits from the outside to the inside of the segment n or another segment and directly reaches the segment n. The second line corresponds to a light obtained when the light transmits from the outside to the inside of the segment n or another segment, reflects on the inner surface of any segment once, and then reaches the segment n. Similarly, the third line corresponds to a light obtained when the light reflects twice, and the same applies to the fourth and subsequent lines.

Then, since the values $r_{out}$, $r_{in}$, $t_{out}$, and $t_{in}$ are uniquely determined in accordance with the application amount x, when the relationship therebetween is identified in advance, the unknown number is substantially N. Therefore, Equation (1) may be solved for N application amounts x.

Note that, in the present invention, calculation of the application amount of a cosmetic material may be performed by using any calculation model other than the calculation model illustrated in Equation (1) and may be performed by adding a simplifying scheme to various calculation models including the calculation model illustrated in Equation (1). While an assumption for simplifying calculation is applied also in an specific example described below, the present invention is not limited thereto.

[Simplification of Calculation Model]

While the item $I_k(k, n)$ is described as being different in each segment in Equation (1), it is assumed that $I_k(k, n) = m(n)m(k)I(k, n)$, for simplified illustration. Note that the item $I(k, n)$ denotes an impulse response function representing a ratio in which a light entering the segment k is emitted out of the segment n, and the item $I(k, k')$ is standardized as the equation below.

[Math 2]

$$1 = \sum_{k'}^m I(k, k')$$

Here, the value k' is a segment number of m segments surrounding the segment k. The item $m(n)m(k)$ represents energy lost in propagation inside the skin when the light enters the point k and exits the point n. Under this assumption, it is assumed that the energy lost inside the skin is determined by the entry point and the exit point.

When the items up to the second line of Equation (1) are employed and the reflectance after a cosmetic material to be targeted for each segment has been applied is denoted as the reflectance $R_p$, N nonlinear simultaneous equations expressed by Equation (2) are obtained. Note that the reflectance $R_p$ after the cosmetic material has been applied may be set identically on the entire portion of the skin, and any reflectance $R_p$ may be set in accordance with the location on the skin.

[Math 3]

$$f_n(x) = -R_p + r_{out}(x_n) +$$
$$\sum_k^N t_{out}(x_n) m(n) t_{in}(x_k) m(k) I(k, n) + \sum_{k_2}^N \sum_{k_1}^N t_{out}(x_n) m(n)$$
$$t_{in}(x_{k_1}) m(k_1) I(k_1, k_2) r_{in}(x_{k_2}) m(k_2) I(k_2, n) = 0$$

Equation (2)

The partial differential coefficient with respect to the application amount $x_k$ at the segment n is expressed by Equation (3).

[Math 4]

$$\left(\frac{\partial f_n(x)}{\partial x_k}\right)_{x_k=a} = \quad \text{Equation (3)}$$

$$\left(\frac{dr_{out}}{dx}\right)_{x=a} \delta_{n,k} + \sum_{k_1=1}^{N} \left\{\left(\frac{dt_{out}}{dx}\right)_{x=a} \delta_{n,k} m(n) t_{in}(x_{k_1}) m(k_1) I(k_1, n) + \right.$$

$$t_{out}(x_n) m(n) \left(\frac{dt_{in}}{dx}\right)_{x=a} \delta_{k_1,k} m(k_1) I(k_1, n) \bigg\} +$$

$$\sum_{k_2}^{N}\sum_{k_1}^{N} \left\{\left(\frac{dt_{out}}{dx}\right)_{x=a} \delta_{n,k} m(n) t_{in}(x_{k_1}) m(k_1) I(k_1, k_2) r_{in}(x_{k_2})\right.$$

$$m(k_2) m(k_2) I(k_2, n) + t_{out}(x_n) m(n) \left(\frac{dt_{in}}{dx}\right)_{x=a} \delta_{k_1,k} m(k_1)$$

$$I(k_1, k_2) r_{in}(x_{k_2}) m(k_2) m(k_2) I(k_2, n) + t_{out}(x_n) m(n)$$

$$t_{in}(x_{k_1}) m(k_1) I(k_1, k_2) \left(\frac{dr_{in}}{dx}\right)_{x=a} \delta_{k_2,k} m(k_2) m(k_2) I(k_2, n) \bigg\}$$

Note that the symbols $\delta_{i,j}$ in Equation (3) are Kronecker delta symbols.

[Math 5]

$$\delta_{i,j} = \begin{cases} 1 & (i = j) \\ 0 & (i \neq j) \end{cases}$$

The nonlinear simultaneous equations can be calculated by the Newton method by using a partial differential coefficient when the initial values can be set appropriately. Note that a method of setting an initial value will be described below.

[Estimation of m(k)]

In accordance with the calculation model described above, the term R(n) is expressed by Equation (4).

[Math 6]

$$R(n) = \sum_{k}^{N} m(n) m(k) I(k, n) \quad \text{Equation (4)}$$

Note that, it is assumed that the terms R(k) and m(k) are a reflectance and an energy loss in the segment k, respectively. Since Equation (4) is a nonlinear simultaneous equation of an unknown number N, N functions are introduced as illustrated in Equation (5) in accordance with the ordinary method, and partial differential coefficients are set as illustrated in Equation (6).

[Math 7]

$$f_n^{Non}(m) = -R(n) + \sum_{k_1}^{N} m_n m_{k_1} I(k_1, n) = 0 \quad \text{Equation (5)}$$

[Math 8]

$$\frac{\partial f_n^{Non}(m)}{\partial m_k} = \sum_{k_1}^{N} \{\delta_{k,n} m_{k_1} I(k_1, n) + \delta_{k,k_1} m_n I(k_1, n)\} \quad \text{Equation (6)}$$

Now, the item m(k) is represented as follows.

[Math 9]

$$m(k) = m_k$$

Further, the initial value is set as illustrated in Equation (7).

[Math 10]

$$\text{Initial } m_k = \sqrt{R(k)} \quad \text{Equation (7)}$$

The item m(k) is then calculated by using Equations (5), (6), and (7).

First Specific Example of Application Amount Calculation (Method with in-Skin Reflection)

Here, to illustrate a specific calculation method of the application amount, an application substance, an application mode, and an application amount distribution are set as illustrated in Equation (8) below.

[Math 11]

$$r_{out} x$$

$$t_{in} = 1-x \quad \text{Equation (8)}$$

The application amount distribution indicates a physical quantity that defines an amount of an application substance such as a volume, a weight, a thickness, or the like of the application substance for each segment on the skin. It is assumed here that the application is performed for each fine segment set on the skin, and calculation of an application amount distribution means calculation of an application amount for each segment. Note that, since each segment has a predetermined area, an application area ratio for each segment can also be used as the application amount. Accordingly, the application substance is assumed to be applied at a predetermined area ratio in each segment. The application substance is assumed to be applied such that the thickness thereof causes the transmittance to be substantially zero. To simplify the illustration, it is assumed that the application substance has no effect to absorb light, and a light emitted on the application substance is reflected without energy loss. That is, it is assumed that an extremely high-concealable white application substance is applied to each segment at a predetermined area ratio. When a segment is applied at an area ratio of 0.4, for example, 40 percent of the light evenly emitted on the segment is reflected, and the remaining 60 percent reaches the skin.

While Equation (8) represents reflection and transmission of a light on the skin surface of interest that is emitted from the outside of the skin surface, in contrast, reflection and transmission of a light arriving from the inside of the skin surface can be expressed as Equation (9).

[Math 12]

$$r_{in} = x$$

$$t_{out} 1-x \quad \text{Equation (9)}$$

In the skin without application on which no application substance is formed, it is assumed that the inner-face reflection is zero and the transmission is one. Note that, while $r_{in}=0$ is obtained when $x=0$, which means that there is an assumption that, in the skin without application, whole the light arriving from the inside is transmitted to the outside, and no inner-face reflection occurs. Each rate of changes of $r_{out}$, $r_{in}$, $t_{out}$, and $t_{in}$ relative to x in this simplified model is expressed by Equations (10) and (11) below.

[Math 13]

$$\frac{dr_{out}}{dx} = 1$$

$$\frac{dt_{in}}{dx} = -1$$

Equation (10)

[Math 14]

$$\frac{dr_{in}}{dx} = 1$$

$$\frac{dt_{out}}{dx} = -1$$

Equation (11)

Then, Equations (12) and (13) are obtained by substituting Equations (8) to (11) into Equations (2) and (3).

[Math 15]

$$f_n(x) = -R_p + x_n + \sum_{k}^{N'}(1-x_n)m(n)(1-x_k)m(k)I(k,n) + \sum_{k_2}^{N'}\sum_{k_1}^{N'}(1-x_n)m(n)(1-x_{k_1})m(k_1)I(k_1,k_2)x_{k_2}m(k_2)I(k_2,n)$$

Equation (12)

[Math 16]

$$\left(\frac{\partial f_n(x)}{\partial x_k}\right)_{x_k=a} = \delta_{n,k} + \sum_{k_1=1}^{N'}\{(-1)\delta_{n,k}m(n)(1-x_{k_1})m(k_1)I(k_1,n) + (1-x_n)m(n)(-1)\delta_{k_1,k}m(k_1)I(k_1,n)\} + \sum_{k_2}^{N'}\sum_{k_1}^{N'}\{(-1)\delta_{n,k}m(n)(1-x_{k_1})m(k_1)I(k_1,k_2)x_{k_2}m(k_2)I(k_2,n) - (1-x_n)m(n)\delta_{k_1,k}m(k_1)I(k_1,k_2)x_{k_2}m(k_2)I(k_2,n) + (1-x_n)m(n)(1-x_{k_1})m(k_1)I(k_1,k_2)\delta_{k_2,k}m(k_2)I(k_2,n)\}$$

Equation (13)

Values 1 to N' indicate a range that affects the point of interest. While the application amount is assumed to be zero outside the range (region of interest) of 1 to N, the term $(1-x_k)$ that represents the value of traveling around of the light becomes 1 and affects the result, and thus the range from 1 to N' is used for calculation.

Equation (14) is used as the initial value to solve Equation (12).

[Math 17]

$$x_k = \frac{R_p - R(k)}{1 - R(k)}$$

Equation (14)

The initial value corresponds to an application amount when it is assumed that no light scatters inside the skin at all and is emitted only at the entry position.

Since the light arriving from the inside of the skin is calculated by including the term in which a light arriving from the inside of the skin is reflected into the skin due to the application substance, the method described above is thus referred to as a method with in-skin reflection.

Second Specific Example of Application Amount Calculation (Method without in-Skin Reflection)

Now, the fourth term of the right side of Equation (12) represents the amount of a light which reaches the surface from the inside of the skin, collides with dots of the application substance, is then reflected inside the skin, reaches the surface again, and is emitted out of the surface. When the fourth term is omitted and the third term is rewritten, Equation (12) is expressed as Equation (15).

[Math 18]

$$(1-x_n)\sum_{k}^{N'}(1-x_k)m(n)m(k)I(k,n) =$$

$$(1-x_n)\left\{\sum_{k}^{N'}m(n)m(k)I(k,n) - \sum_{k}^{N'}x_k m(n)m(k)I(k,n)\right\} =$$

$$(1-x_n)\left\{R(n) - \sum_{k}^{N'}x_k m(n)m(k)I(k,n)\right\}$$

Equation (15)

When Equation (15) is rewritten into the form of a simultaneous equation, a simplified equation such as Equation (16) is obtained.

[Math 19]

$$f_n^i(x) = -R_p + x_n + (1-x_n)\left\{R(n) - \sum_{k}^{N'}x_k m(n)m(k)I(k,n)\right\} = 0$$

Equation (16)

From the curly brackets of Equation (16), it can be read that the reflectance R(n) decreases by the amount of the impulse (the second term in the curly brackets) generated by dots of the application substance.

The partial differential value is expressed as below, and simplified Equation (17) is obtained.

[Math 20]

$$\frac{f_n^i(x)}{\partial x_k} = \delta_{n,k} - \delta_{n,k}\left\{R(n) - \sum_{k_1}^{N}x_{k_1}m(n)m(k_1)I(k_1,n)\right\} - (1-x_n)\left\{\sum_{k_1}^{N}\delta_{k_1,k}m(n)m(k_1)I(k_1,n)\right\}$$

Equation (17)

Since the light arriving from the inside of the skin is not reflected inside the skin due to the application substance and is directly lost, the method described above is referred to as a method without in-skin reflection.

Then, the application control device and the application control method according to each embodiment of the present invention by using the calculation models described above will be described below.

[Application Control Device Operation]

Figure 5:
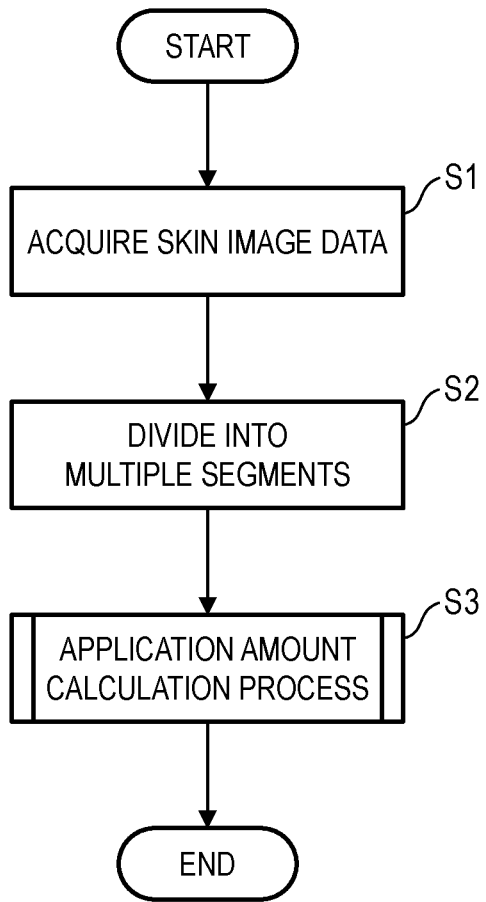
FIG. 5 is a flowchart illustrating an operation of an application control method according to the first embodiment.

FIG. 5 is a flowchart illustrating the operation in the application control device according to the first embodiment of the present invention. Each step of the operation of the application control device will be sequentially described below.

[Skin Image Data Acquisition (Step S1; Acquisition Step)]

First, the CPU 305 acquires, from the storage device 308, image data of a skin captured by an external image pickup device (not illustrated), which is a target to which a cosmetic material is applied, and loads the data to the RAM 306. Image data of the skin are pre-stored in the storage device 308. For example, image data of the skin may be stored in the storage device 308 from an external device such as an image pickup device, a personal computer, or the like via the I/F 310 or may be stored in the storage device 308 from the internet via the I/F 310. Further, a memory card as the storage device 308 in which image data of the skin is pre-stored may be attached to a memory card slot (not illustrated) provided in the application control device 300 for use. The CPU 305 forms the acquisition unit.

The image data of the skin includes at least optical information and position information corresponding to each of a plurality of pixels. The optical information preferably includes an illuminance value and may be information in a YUV format, for example. The position information may be in any type as long as it includes two-dimensional position information.

In the description below, while the application amount is calculated based on the illuminance value, a signal in a specific wavelength range (color component) may be used, or the value of each color may be used. Therefore, any wavelength of a visible range, preferably greater than or equal to 600 nm, may be selected by using a bandpass filter or the like, any signal, preferably an R-signal, may be selected from RGB signals, or any signal, preferably an Y-signal, may be selected from YUV signals.

The size of the acquired image data is not particularly limited as long as the image data can be divided into a plurality of segments and the application amount can be accurately calculated in an application amount calculation process (step S3) described below. The resolution is desirably high up to a limit at which recognition by human naked eyes is possible, may be higher than the limit, and is preferably high so as not to cause an excessively high load in image processing.

[Division into Multiple Segments (Step S2: Division Step)]

Next, the CPU 305 divides the acquired image data into a plurality of segments. The CPU 305 forms the division unit.

The image data is divided such that one side of the segment is smaller than or equal to 200 μm, preferably larger than or equal to 20 μm and smaller than or equal to 150 μm. By dividing image data such that one side of the segment is smaller than or equal to 200 μm, it is possible to calculate a precise application amount distribution up to a level at which determination by naked eyes is not easy, and it is possible to naturally conceal a partial difference in brightness. Further, it is possible to conceal the partial difference in brightness more naturally by setting one side smaller than or equal to 150 μm, and it is possible to reduce the processing load in the application amount calculation process described below by setting one side larger than or equal to 20 μm.

Specifically, the CPU 305 can divide the image data into N segments as illustrated in FIG. 4. Each segment is a square having one side smaller than or equal to 200 μm and the same area. Note that the shape of the segment may not necessarily be a square and may be a rectangle or any polygon. In this case, the distance between the centers of adjacent segments is preferably smaller than or equal to 200 μm, for example, larger than or equal to 20 μm and smaller than or equal to 150 μm. The division of image data may be performed by averaging the illuminance values of a plurality of pixels divided more finely than the pixel pitch described above. For example, the CPU 305 can average the illuminance values of a plurality of pixels of 10 μm pitch and calculate segments having a desired pixel pitch.

Further, the CPU 305 may perform not only the image processing for dividing image data into a plurality of segment but also other image processing. In the present embodiment, it is desirable to remove noise of the image data before the division process and remove noise due to a fine foreign object, a skin pore, or the like present on the skin in advance.

[Application Amount Calculation Process (Step S3: Calculation Step)]

The CPU 305 then calculates an application amount of the cosmetic material to be applied to each portion of the skin corresponding to each segment from the value of each of the N divided segments. The CPU 305 forms the calculation unit. Further, the value of a segment used for the application amount calculation is optical information included in the segment and preferably is an illuminance value.

At the application amount calculation, a value of a single segment out of the N segments may be used to calculate an application amount of the cosmetic material to be applied to a portion of the skin corresponding to the single segment. Then, by repeating such calculation of an application amount for all of the N segments, an application amount for each portion of the skin may be calculated. Further, values of a plurality of segments out of the N segments may be used to calculate an application amount of the cosmetic material to be applied to each portion of the skin corresponding to the plurality of segments. Note that, in the present embodiment, while the illuminance values of all of the N segments are used to calculate an application amount of the cosmetic material to be applied to each portion (N regions) of the skin corresponding to the N segments, a specific calculation of an application amount of the cosmetic material will be described below.

In the present embodiment, after calculation of the application amount of the cosmetic material to be applied to the skin, the CPU 305 smooths application amounts of the cosmetic material obtained for each segment by performing a smoothing process. The smoothing process is not particularly limited and may be performed by using various spatial filters, for example, which may be a method of a process by using the Gaussian filter illustrated in FIG. 6. By performing the smoothing process, it is possible to conceal a local difference in brightness on the skin smoothly and more naturally.

Note that, when an application amount of a cosmetic material is calculated based on a reflectance that includes and uses all wavelengths without distinction of respective wavelengths for a wide range of unspecified wavelengths (for example, the entire visible region), the application amount is slightly excessive at a wavelength having a low reflectance. Further, when an application amount of the cosmetic material is calculated based on the reflectance for a specific wavelength (color), the application amount may have slight excess or shortage on a wavelength other than the specific wavelength. Therefore, to compensate the resulted excess or shortage so as not to cause unnaturalness, it is preferable to perform coloring by the cosmetic material. When the application amount is excessive, for example, it is preferable to appropriately compensate insufficient absorption at the position of the excessive application amount, that is, it is preferable to perform coloring. At this time, for example, by using $r_{out}$, $r_{in}$, $t_{out}$, and $t_{in}$ as functions of the absorptance in Equation (2) and partially differentiating the absorptance, absorption for each wavelength can be calculated. Therefore, based on the calculated absorption for each wavelength, by applying the application substance corresponding to each wavelength (color) for each segment, it is possible to perform makeup exhibiting a good tinge, for example. It is also possible to apply three types of application substances arranging three colors of yellow, magenta, and cyan, respectively, for example, so as to exhibit a desired color by being mixed on the segment.

[Application Amount Calculation by Method with In-Skin Reflection]

Figure 7:
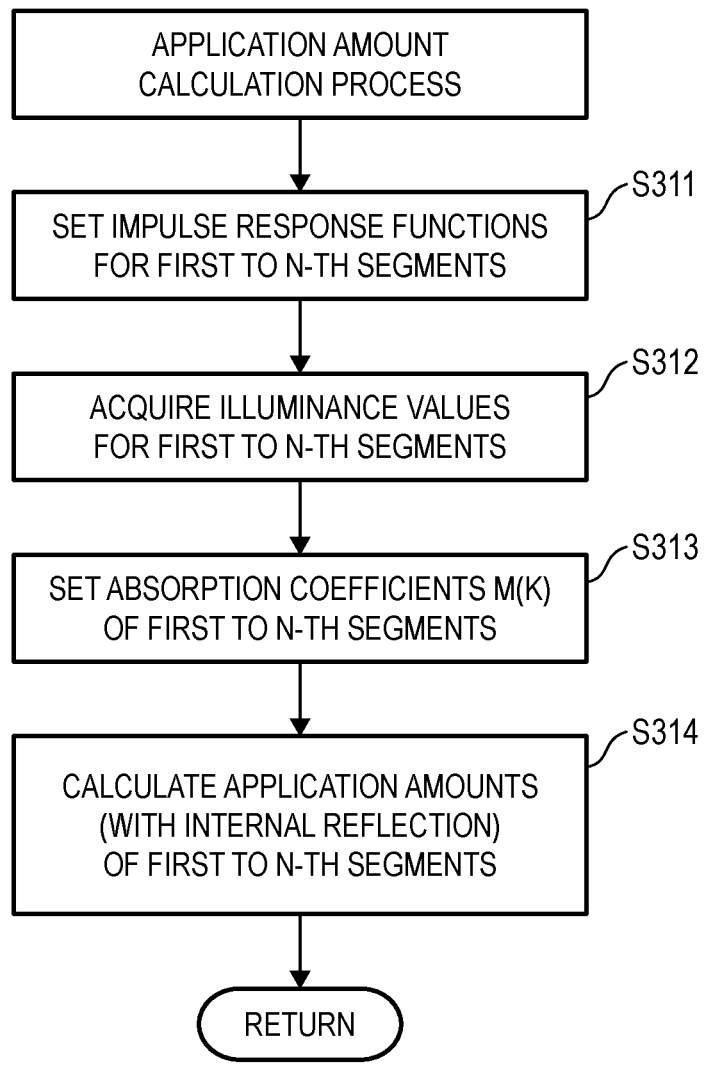
FIG. 7 is a flowchart illustrating a flow of application amount calculation according to the first embodiment.

Next, a specific calculation of an application amount of a cosmetic material in the first embodiment will be described. FIG. 7 is a flowchart illustrating a flow of the application amount calculation according to the first embodiment of the present invention. In the application amount calculation process in the present embodiment, the CUP 305 performs calculation of an application amount of a cosmetic material by using the calculation model of the method with in-skin reflection, that is, Equations (12) and (13) described in the calculation model described above.

[Impulse Response Function Setting (Step S311)]

First, the CPU 305 sets an impulse response function for each of the N segments divided in step S2 in FIG. 5. The impulse response function represents the scattering of light between each portion of the skin corresponding to each of the N segments. One of the N segments is used as a target segment, and segments other than the target segment are used as non-target segments. In this case, the impulse response function is a function representing a ratio at which a light that has entered a target portion of the skin corresponding to a target segment emitted out of the surface of the target portion of the skin, or a ratio at which a light that has entered a non-target portion of the skin corresponding to a non-target segment is emitted out of the surface of the target portion of the skin.

At this time, the same impulse response function may be set to all of the first to the N-th segments. Further, by measuring the impulse response in each of the first to the N-th segments, impulse response functions different for respective segments (N patterns) may be set.

[Illuminance Value Acquisition (Step S312)]

Next, the CPU 305 acquires the illuminance value from each of the first to N-th segments.

[Absorption Coefficient m(k) Setting (Step S313)]

Further, the CPU 305 sets an absorption coefficient m(k) for each of the first to N-th segments by using Equations (5) and (6).

[Application Amount Calculation (Step S314)]

The CPU 305 then calculates an application amount of the cosmetic material to be applied to each portion of the skin corresponding to each of the first to N-th segments by using the calculation model with internal reflection represented by Equations (12) and (13), and the application amount calculation process (step S3 in FIG. 5) ends.

In other words, with respect to the calculation of the application amount of a cosmetic material in this step S314, it can be said that the calculation of the application amount of the cosmetic material in this step S314 is based on a light reflection scattering model described below. That is, the light reflection scattering model used in step S314 is a model in which a light obtained at a target portion of the skin corresponding to the target segment includes at least a component described in the sections (A) to (C) described below when one of the N segments is used as a target segment.

(A) In a light emitted to the surface of the target portion of the skin corresponding to a target segment, a component which is reflected from the surface of a target portion of the skin without transmission to the inside (B) In a light emitted to the surface of the target portion of the skin corresponding to a target segment, a component which is reflected after transmission from the surface to the inside of a target portion of the skin and then emitted out of the surface of the target portion (C) In a light emitted to the surface of the non-target portion of the skin corresponding to a non-target segment that is other than the target segment, a component which is reflected after transmission from the surface of a non-target portion of the skin to the inside and then emitted out of the surface of the target portion of the skin According to the first embodiment described above, by dividing the image data into segments smaller than or equal to 200 μm, it is possible to calculate a precise application amount distribution up to a level at which determination by naked eyes is not easy, and it is possible to naturally conceal a partial difference in brightness. Further, since an application amount can be calculated more accurately by using the calculation model in which reflection inside the skin and scattering of a light inside the skin obtained by the impulse response function are considered, it is possible to conceal a local difference in brightness on the skin more naturally.

Second Embodiment: Method without In-Skin Reflection

Figure 8:
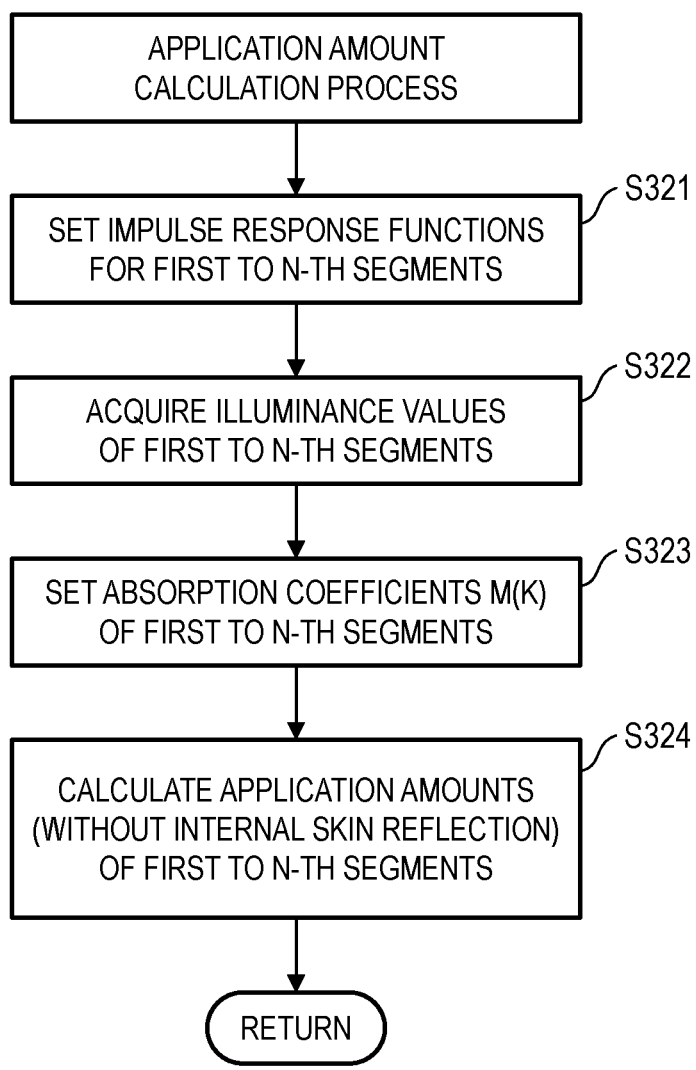
FIG. 8 is a flowchart illustrating a flow of application amount calculation according to a second embodiment.

Next, a specific calculation of an application amount of a cosmetic material of a second embodiment will be described. FIG. 8 is a flowchart illustrating a flow of the application amount calculation according to the second embodiment of the present invention. In the application amount calculation process in the present embodiment, the CUP 305 performs calculation of an application amount of a cosmetic material by using the calculation model of the method without in-skin reflection, that is, Equations (16) and (17) described in the calculation model described above.

Compared to the first embodiment (method with in-skin reflection) described above, the second embodiment is different in only the calculation of an application amount (step S314 in FIG. 7). That is, skin image data acquisition (step S1 in FIG. 5) and division into a plurality of segments (step S2 in FIG. 5) are the same as those in the first embodiment. Further, in the application amount calculation process (step S3 in FIG. 5), the steps from the setting of an impulse response function (step S311 in FIG. 7 and step S321 in FIG. 8) to the setting of the absorption coefficient m(k) (step S313 in FIG. 7 and step S323 in FIG. 8) are the same as in the first embodiment. Therefore, only the application amount calculation (step S324 in FIG. 8) will be described here, and other description will be omitted.

[Application Amount Calculation (Step S324)]

An impulse response function, an illuminance value, and an absorption coefficient m(k) are set for each of the first to N-th segments. The CPU 305 calculates an application amount of a cosmetic material for each of the first to N-th segments by using the calculation model without internal reflection represented by Equations (16) and (17), and the application amount calculation process (step S3 in FIG. 5) ends. In other words, with respect to the calculation of the application amount of the cosmetic material in this step S324, the calculation amount is calculated based on a light reflection scattering model from which the component described in (C) in step S314 (FIG. 7) of the first embodiment is excluded (that is, the components described in (A) and (B) described above are included).

According to the second embodiment described above, by dividing the image data into segments smaller than or equal to 200 µm, it is possible to calculate a precise application amount distribution up to a level at which determination by naked eyes is not easy, and it is possible to naturally conceal a partial difference in brightness. Further, since the application amount can be calculated more accurately by using the calculation model in which scattering of light inside the skin obtained by the impulse response function is taken into consideration, it is possible to conceal a local difference in brightness on the skin more naturally. Note that, while reflection inside the skin is not considered, the processing load in the application amount calculation process can be reduced accordingly.

Third Embodiment: Method Using Initial Solution

Figure 9:
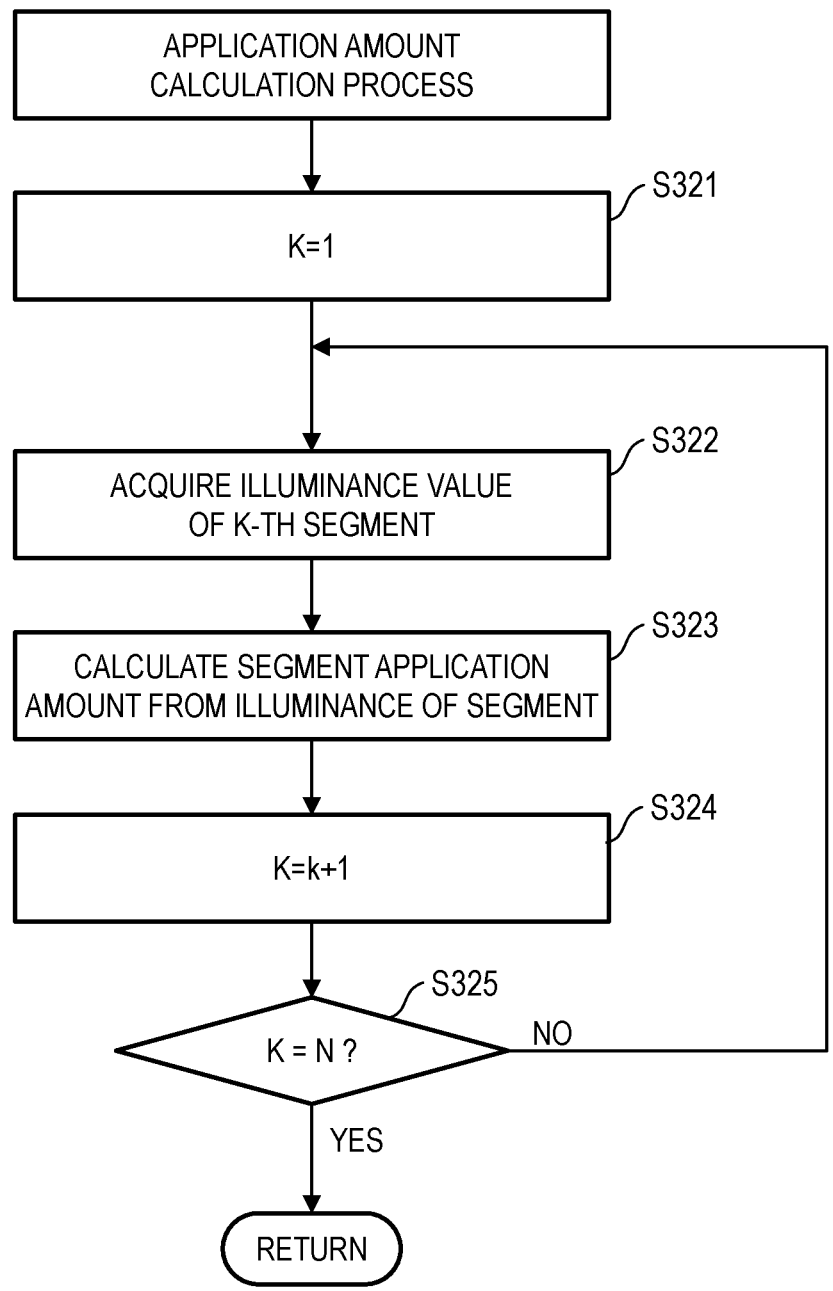
FIG. 9 is a flowchart illustrating a flow of application amount calculation according to a third embodiment.

Further, a specific calculation of an application amount of a cosmetic material of a third embodiment will be described. FIG. 9 is a flowchart illustrating a flow of the application amount calculation according to the third embodiment of the present invention. In the application amount calculation process in the present embodiment, the CUP 305 performs the calculation of the application amount of the cosmetic material by using a method in which the initial solution is applied to the calculation model, that is, Equation (14) described in the calculation model described above.

Compared to the first and second embodiments described above, the third embodiment is different in only the calculation process of an application amount (step S3 in FIG. 5). That is, the acquisition of skin image data (step S1 in FIG. 5) and division into a plurality of segments (step S2 in FIG. 5) are the same as those in the first and second embodiments. Therefore, only the application amount calculation process (step S3 in FIG. 5) will be described here, and other description will be omitted.

[Setting k=1 (step S331)]

First, the CPU 305 sets k=1.

[Illuminance Value Acquisition of k-th Segment (step S332)]

Next, the CPU 305 acquires the illuminance value from the k-th segment out of the N segments divided in step S2 in FIG. 5.

[Application Amount Calculation (step S333)]

Further, the CPU 305 calculates an application amount of a cosmetic material of the k-th segment by using the calculation model described above by using the initial solution represented by Equation (14).

[Setting k=k+1 (Step S334)]

The CUP 305 then adds 1 to the value of k to set k=k+1.

[Determination of k=N (Step S335)]

After the above, the CPU 305 determines whether or not the values k and N are the same. If the determination result is NO, there is a segment for which the application amount is not calculated, and thereby the process returns to step S332. If the determination result is YES, since the application amounts have been calculated for all of the N segments, the application amount calculation process (step S3 in FIG. 5) ends.

According to the third embodiment described above, by dividing the image data into segments smaller than or equal to 200 µm, it is possible to calculate a precise application amount distribution to a level at which determination by naked eyes is not easy, and it is possible to naturally conceal a partial difference in brightness. Note that, while scattering of light inside the skin or reflection inside the skin is not considered, the processing load in the application amount calculation process can be significantly reduced accordingly.

In the first to third embodiments described above, while all of the acquisition unit, the division unit, and the calculation unit are included in the CPU 305 provided in the application control device 300, some or all of these units may be replaced by using cloud computing.

Further, application of a method of calculating an application amount of a cosmetic material described above is not limited to only controlling the application of the cosmetic material by an application device employing an ink-jet or the like. According to the method of calculating an application amount of a cosmetic material described above, it is also possible to provide a makeup simulation image in which a makeup is performed with the calculated application amount or provide a makeup advice system that advises on makeup.

[Program and Storage Medium]

A program according to an embodiment of the present invention causes a computer to execute each step of the control described in the first to third embodiments described above. The language of the program or the like is not particularly limited, and any well-known and commonly used language can be used.

Further, a storage medium according to an embodiment of the present invention is a computer readable storage medium that stores the program described above. The type of the storage medium or the like is not particularly limited, and any well-known and commonly used storage medium can be used.

EXAMPLE

While the present invention will be further described in detail by using examples and comparative examples below, the present invention is not limited to these examples.

In the examples and the comparative examples, a case where the initial solution is applied to the calculation model (Example 1, Equation (14)), a case where the calculation model with in-skin reflection is used (Example 2, Equations (12) and (13)), and a case where the calculation model without in-skin reflection is used (Example 3, Equations (16) and (17)) are compared for age spots on the skin. Further, results obtained when a cosmetic material is applied by being shifted inward and outward by 200 µm as Comparative Examples 1 and 2, respectively, are also illustrated. Further, in the examples and the comparative examples, the results were reviewed by performing a Monte Carlo simulation having a high reliability in experiments.

Examples 1 to 3

[(1) Spot Skin Model]

A multilayer film model was applied to the skin, and values of a general skin were set to parameters of the optical properties for each layer. The central 6.4 mm square in the skin of 12.8 mm square was used as a spot. The reflectance was calculated for each segment of 100 µm square in the central cross section. To output an average on a segment basis, the average of illuminances of 16 points measured in the segment (area of 10000 µm$^2$) was used. The average was used as R(k) in the calculation below.

Figure 10:
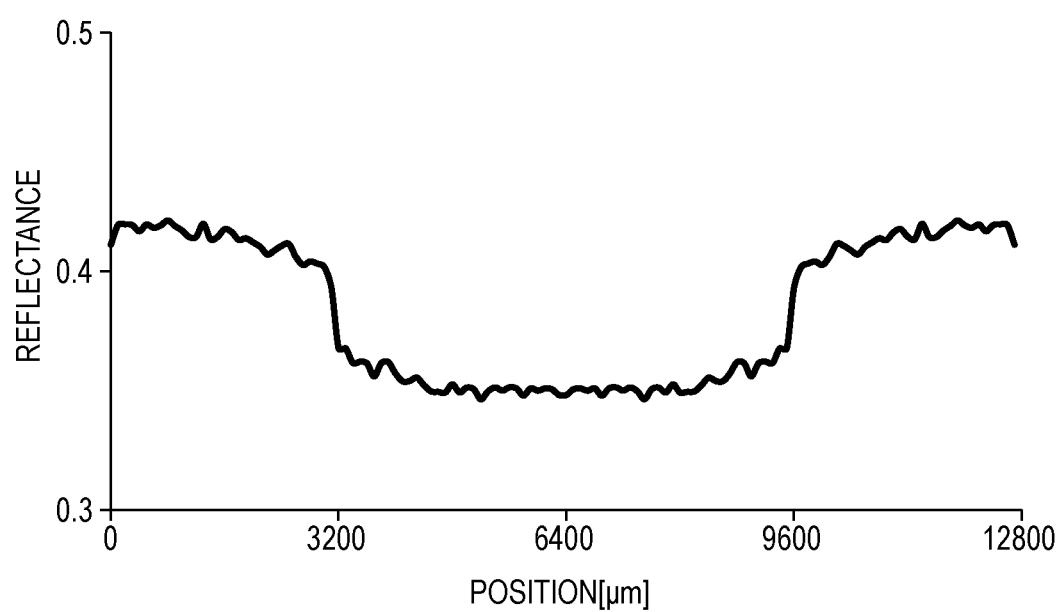
FIG. 10 is a graph illustrating a reflectance distribution in a spot skin model.

The result of simulating the spot skin model by using the Monte Carlo simulation is illustrated in FIG. 10. FIG. 10 is a graph illustrating the simulation result of a reflectance distribution in the spot skin model and a graph illustrating the reflectance relative to the position in the central cross section of the spot skin model.

As clearly illustrated in FIG. 10, it can be seen that the reflectance decreases at the central portion that is set as an age spot at which light absorption occurs. The boundary portion gradually changes without being formed into a right-angled shape, and it is thus considered that there is an effect of internal scattering also on the skin.

[(2) Impulse Response Function]

Figure 11:
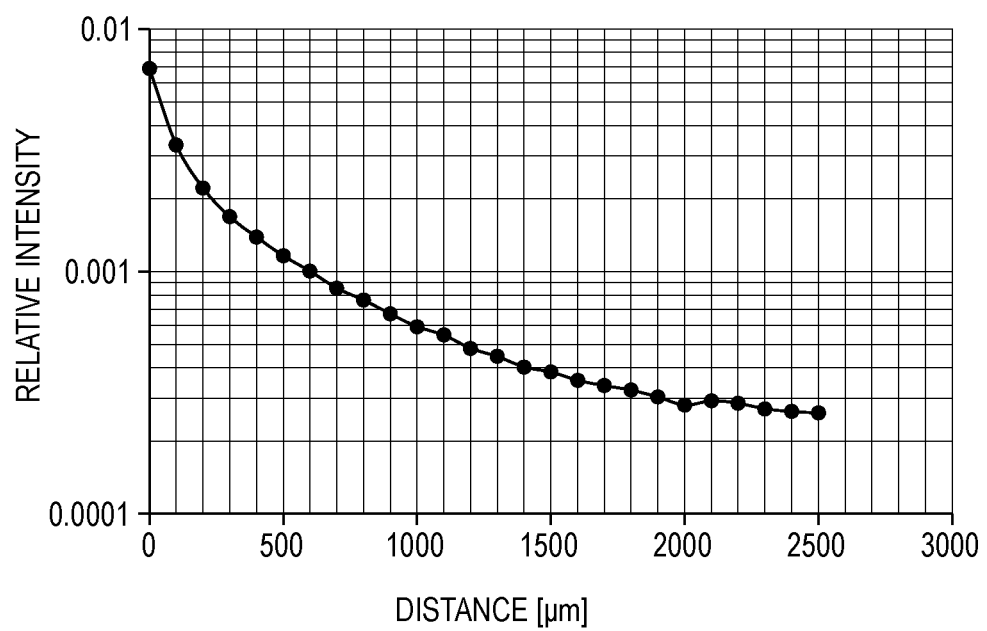
FIG. 11 is a graph illustrating an impulse response function when a light is emitted to a spotless skin model.

Next, the spotless skin model was set, the light was evenly emitted at an incident angle of zero degree in the center 100 μm square, and the illuminance of the light emitted out of the periphery in the direction of zero degree was measured. The measurement was performed in the range of 5.1 mm×5.1 mm, and averaging was performed for each 100 μm square segment. The obtained illuminance was normalized such that the sum is 1 in the measured range. FIG. 11 is a graph illustrating the impulse response function obtained by simulating a case when the light is emitted to the spotless skin model.

[(3) Calculation of m(k)]

Based on the reflectance distribution in the spot-skin calculated in section (1) described above, the distribution of m(k) was calculated as nonlinear simultaneous equations by using Equations (5) and (6). Further, the distribution of m(k) was calculated by using the initial solution (Equation (7)). Each of the segments was 100 μm square in the skin of 12.8 mm square. The number of simultaneous equations is 16384 (=$128^2$).

Figure 12:
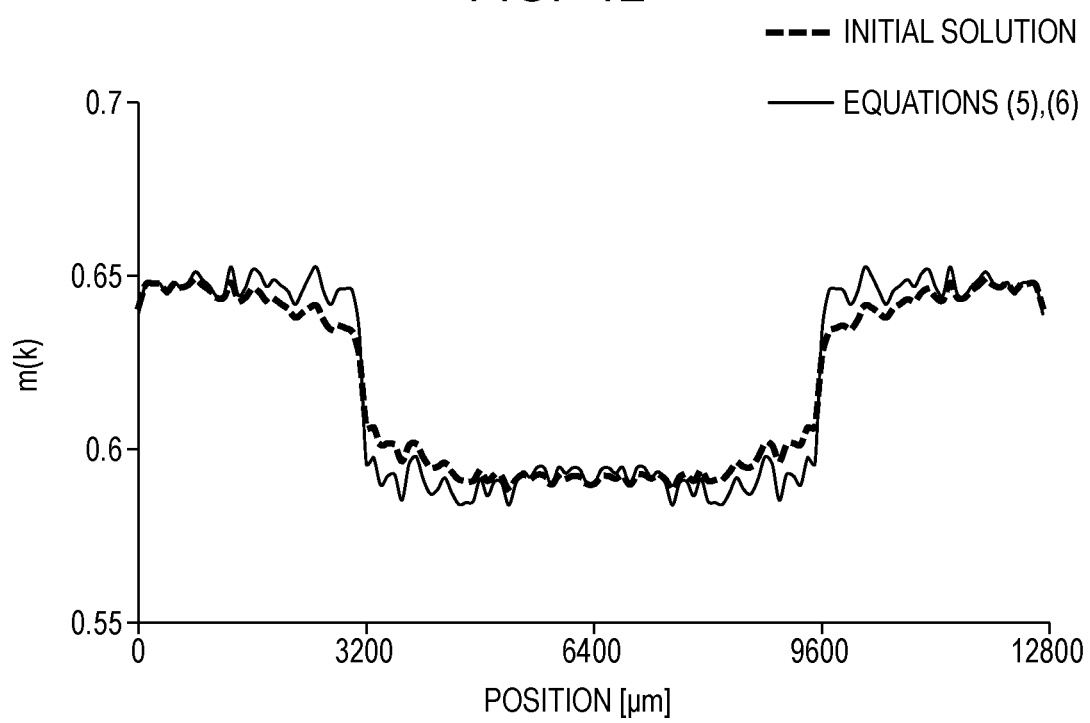
FIG. 12 is a graph illustrating a distribution of m(k) in the spot skin model.

FIG. 12 is a graph illustrating the distribution of m(k) obtained by a simulation in the spot-skin model. In calculation, when an error was set to $1.0e^{-6}$, the solution converged. While the initial solution (broken line) had a gradual change in the boundary because the square root of m(k) was used as the initial solution, the distribution (solid line) of m(k) obtained from Equations (5) and (6) had a sharp change and was closer to an absorption distribution that was set to have a right-angled shape in the skin model.

[(4) Calculation of Application Amount]

Based on m(k) determined in the section (3) described above, distributions of the application amount of the cosmetic material were determined by using Equations (12) and (13) with in-skin reflection and Equations (16) and (17) without in-skin reflection. Further, the distribution of the application amount of the cosmetic material was determined also in the case (Equation (14)) where the initial solution was applied to the calculation model. At this time, in the present embodiment, the reflectance $R_p$ (target reflectance) after the cosmetic material was applied was set to 0.42 evenly on the entire portion of the skin. Further, while the calculation was performed until the error to $R_p$ becomes smaller than or equal to 0.00001 in Example 1 and the error to $R_p$ becomes smaller than or equal to 0.0001 in Example 2, (no error occurred in Example 3, because the initial solution was used), the present invention is not limited thereto. For example, when the error is set to smaller than or equal to 0.001, a good result can be obtained without requiring an excessive processing load.

Figure 13:
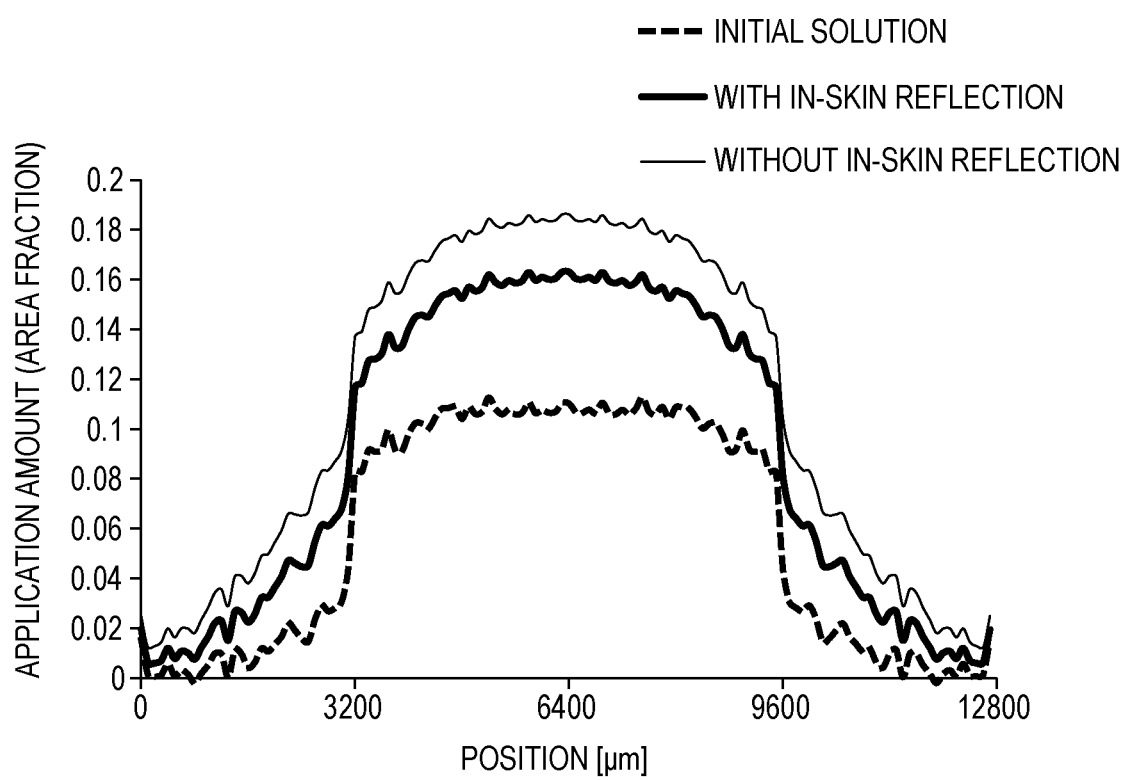
FIG. 13 is a graph illustrating a distribution of an application amount of a cosmetic material in the spot skin model.

FIG. 13 is a graph illustrating the distribution of the application amount of the cosmetic material obtained by a simulation in the spot skin model. According to FIG. 13, as compared to the model with the initial solution (broken line), the application amount increased in both models with in-skin reflection (thick line) and without in-skin reflection (thin line). Especially in the case of the model without in-skin reflection (thick line), the increase was large. This is considered to be caused due to assumption that light was lost.

[(5) Application Amount Distribution Estimation by Monte Carlo Simulation]

Next, the effect of the application substance was introduced on the surface in the skin models set in the above section (4). The application substance was used as having no thickness. In the light entering the application area, the surface reflection was calculated based on the Bidirectional Reflectance Distribution Function, and the entire light entering the inside of the application substance were used as the light emitted out of the entry position as a complete scattered light.

Each area ratio of the application substance in the segment was calculated by using the application amount distribution obtained by using the initial solution of Equation (14), the application amount distribution obtained by using Equations (12) and (13) with in-skin reflection, and the application amount distribution obtained by using Equations (16) and (17) without in-skin reflection, respectively, and the reflectance distribution after application is represented.

Figure 14:
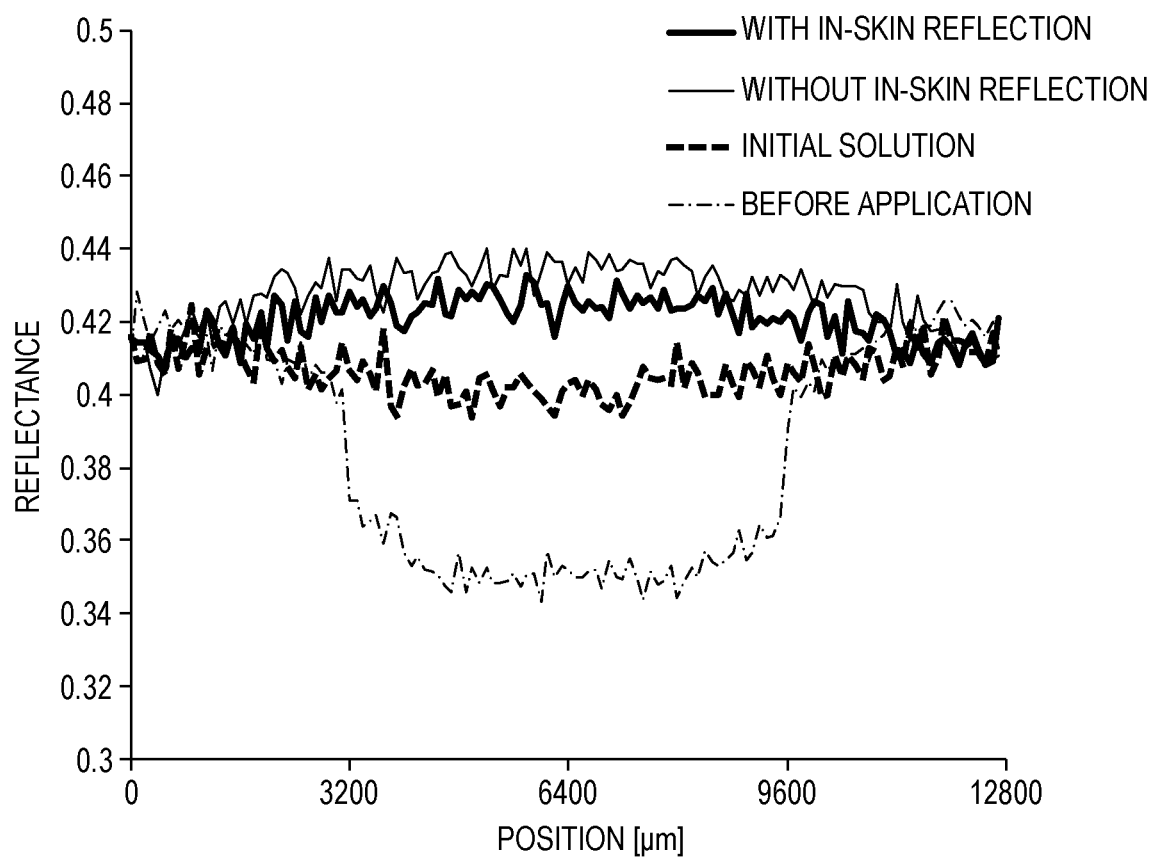
FIG. 14 is a graph illustrating a reflectance distribution before application of a cosmetic material and reflectance distributions of Examples 1 to 3.

FIG. 14 illustrates each calculation result. The bold line represents the reflectance distribution of Example 1 calculated from Equations (12) and (13) with in-skin reflection. The thin line represents the reflectance distribution of Example 2 calculated from Equations (16) and (17) without in-skin reflection. The broken line represents the reflectance distribution of Example 3 obtained by applying the initial solution (Equation (14)) to the calculation model. Further, the dashed-dotted line represents the reflectance distribution before the application of the cosmetic material. According to FIG. 14, the following was found.

In Example 3, it was found that significant improvement was seen in a drop of the reflectance, that is, an age spot. In Example 3, since a loss caused by spread of light was not considered at all, although the correction was slightly insufficient compared to Examples 1 and 2, it was seen that a good concealing effect was obtained. Further, since the initial solution was used and no complex simultaneous equation was required to be solved, the processing load in Example 3 was extremely small.

In Example 2, it was found that significant improvement was seen in a drop of the reflectance, that is, an age spot. In Example 2, since the largest loss due to scattering of light inside the skin was estimated, although it is estimated that the portion of the age spot was corrected to a slightly higher level, it was seen that a good concealing effect was obtained.

In Example 1, it was found that significant improvement was seen in a drop of the reflectance, that is, an age spot, and the reflectance was substantially even. In Example 1, since the loss was slightly overestimated by setting the inner-face reflection to occur up to twice, although the portion of the age spot was corrected to a slightly higher level, it was seen that a significantly good concealing effect was obtained.

Now, in view of the application amount distributions in FIG. 14, while the absolute values of the application amount are different from each other in Examples 1 to 3, the way of change in the application amount at the boundary can be regarded as substantially the same including the initial solution. When it is assumed that Example 3 is a case with no loss and Example 2 is a case with an excessive loss, a desirable application amount will appear between the results of Examples 2 and 3, and it is considered that a preferable application amount distribution can also be obtained by multiplying the distribution obtained by using the initial solution by an appropriate correction factor. Therefore, the scope of the present invention can also include overpainting an application amount distribution pattern obtained by using the initial solution for multiple times.

Comparative Example 1

Next, the application amount distribution obtained in Example 3 was shifted outward by 200 µm from the center, and a reflectance distribution after application of the cosmetic material was obtained in the same manner as in Example 3 except that the shift was introduced to the surface of the skin model. FIG. 15 is a graph illustrating the reflectance distribution of Comparative Example 1.

As clearly seen from FIG. 15, it was found that two great peaks (convex portions) appeared, and the boundary became unnatural.

Comparative Example 2

Next, the application amount distribution obtained in Example 3 was shifted inward by 200 µm to the center, and a reflectance distribution after application of the cosmetic material was obtained in the same manner as in Example 3 except that the shift was introduced to the surface of the skin model. FIG. 16 is a graph illustrating the reflectance distribution of Comparative Example 1.

As clearly seen from FIG. 16, it was found that two great peaks (recess portions) appeared, and the boundary became unnatural.

In Comparative Examples 1 and 2, when a cosmetic material is applied to a skin, a partial difference in brightness was not naturally concealed due to occurrence of the shift of 200 µm.

As is apparent from Examples 1 to 3 and Comparative Examples 1 and 2 described above, it was found that a local difference in brightness of a skin is naturally concealed by performing a precise division of segments smaller than or equal to 200 µm and calculating an application amount of a cosmetic material.

REFERENCE SIGNS LIST 10 application system, 100 application device, 101 application head, 102 cosmetic material tank, 103 motion mechanism, 104 operating unit, 105 distance sensor, 106 motion sensor, 200 image capture unit, 300 application control device, 301 display, 302 image processing circuit, 303 gap control circuit, 304 head control circuit, 305 CPU (acquisition unit, division unit, and calculation unit), 306 RAM, 307 ROM, 308 storage device (storage unit), 309 speaker, 310 I/F, 411 epidermal layer, 411a horny layer, 411b melanin pigmented portion, 412 dermis layer, 413 hypodermis tissue, 414 artery, 415 vain

The invention claimed is:

1. An application control device comprising:
an acquisition unit that acquires image data of a skin;
a division unit that divides the image data into a plurality of segments each smaller than or equal to 200 µm; and
a calculation unit that calculates, from a value of each segment of the plurality of segments of the image data, an application amount of a cosmetic material to be applied to each portion of the skin corresponding to the plurality of segments, the value of each segment of the plurality of segments is of a light scattering with respect to light entering at least a first portion of skin corresponding to a first segment of the plurality of segments and light emitting from a second portion of the skin corresponding to a second segment of the plurality of segments, wherein each segment of the plurality of segments has a center, and a distance between the centers of adjacent segments out of the plurality of segments is larger than or equal to 20 µm and smaller than or equal to 150 µm.

2. The application control device according to claim 1, wherein the image data includes an illuminance value.

3. The application control device according to claim 1 further comprising:
a storage unit that stores the image data; and
an application head that forms an application film of the cosmetic material by ejecting the cosmetic material to the skin based on the application amount of the cosmetic material calculated by the calculation unit,
wherein the acquisition unit acquires the image data from the storage unit.

4. An application control device, comprising:
an acquisition unit that acquires image data of a skin;
a division unit that divides the image data into a plurality of segments each smaller than or equal to 200 µm; and
a calculation unit that calculates, from a value of one or more of a plurality of segments of the image data, an application amount of a cosmetic material to be applied to each portion of the skin corresponding to the plurality of segments, the value is of a light scattering between each portion of the skin corresponding to the plurality of segments, wherein the calculation unit calculates the application amount of the cosmetic material to be applied to each portion of the skin using an impulse response function that represents the light scattering between each portion of the skin corresponding to each of the plurality of segments.

5. The application control device according to claim 4, wherein when one of the plurality of segments is used as a target segment, the impulse response function represents:
a ratio at which a light entering a target portion of the skin corresponding to the target segment is emitted out of a surface of the target portion of the skin, or a ratio at which a light entering a non-target portion of the skin corresponding to a non-target segment other than the target segment is emitted out of a surface of the target portion of the skin.

6. The application control device according to claim 4, wherein the calculation unit calculates the application amount of the cosmetic material based on a light reflection scattering model; and
wherein a light obtained at the target portion of the skin corresponding to the target segment when one of the plurality of segments is used as a target segment in the reflection scattering model at least includes:
in the light emitted to a surface of a target portion of the skin corresponding to the target segment, a component which is reflected from the surface of a target portion of the skin without inward transmission from the surface;
in the light emitted to the surface of the target portion of the skin corresponding to the target segment, a component which is reflected after inward transmission from the surface of a target portion of the skin and then emitted out of the surface of the target portion of the skin; and
in the light emitted to the surface of the non-target portion of the skin corresponding to the non-target segment other than the target segment, a component which is reflected after inward transmission from the surface of a non-target portion of the skin and then emitted out of the surface of the target portion of the skin.

7. An application control method comprising steps of:
acquiring image data of a skin;
dividing the image data into a plurality of segments each smaller than or equal to 200 μm; and
calculating, from a value of each segment of the plurality of segments of the image data, an application amount of a cosmetic material to be applied to each portion of the skin corresponding to the plurality of segments, the value of each segment of the plurality of segments is of a light scattering with respect to light entering at least a first portion of skin corresponding to a first segment of the plurality of segments and light emitting from a second portion of the skin corresponding to a second segment of the plurality of segments, wherein each segment of the plurality of segments has a center, and a distance between the centers of adjacent segments out of the plurality of segments is larger than or equal to 20 μm and smaller than or equal to 150 μm.

8. A non-transitory computer-readable medium comprising computer-executable instructions that cause a computer to execute:

an acquisition process that acquires image data of a skin;
a division process that divides the image data into a plurality of segments each smaller than or equal to 200 μm; and
a calculation process that calculates, from a value of each segment of the plurality of segments of the image data, an application amount of a cosmetic material to be applied to each portion of the skin corresponding to the plurality of segments, the value of each segment of the plurality of segments is of a light scattering with respect to light entering at least a first portion of skin corresponding to a first segment of the plurality of segments and light emitting from a second portion of the skin corresponding to a second segment of the plurality of segments, wherein each segment of the plurality of segments has a center, and a distance between the centers of adjacent segments out of the plurality of segments is larger than or equal to 20 μm and smaller than or equal to 150 μm.

* * * * *